(12) United States Patent
Coolidge

(10) Patent No.: US 10,156,246 B2
(45) Date of Patent: Dec. 18, 2018

(54) DIRECTIONAL CONTROL VALVE

(71) Applicant: Parker-Hannifin Corporation, Cleveland, OH (US)

(72) Inventor: Gregory T. Coolidge, Elyria, OH (US)

(73) Assignee: Parker-Hannifin Corporation, Cleveland, OH (US)

(*) Notice: Subject to any disclaimer, the term of this patent is extended or adjusted under 35 U.S.C. 154(b) by 109 days.

(21) Appl. No.: 15/513,384

(22) PCT Filed: Sep. 29, 2015

(86) PCT No.: PCT/US2015/052954
§ 371 (c)(1),
(2) Date: Mar. 22, 2017

(87) PCT Pub. No.: WO2016/054047
PCT Pub. Date: Apr. 7, 2016

(65) Prior Publication Data
US 2017/0306989 A1 Oct. 26, 2017

Related U.S. Application Data

(60) Provisional application No. 62/057,209, filed on Sep. 29, 2014.

(51) Int. Cl.
*F16K 31/12* (2006.01)
*F15B 11/16* (2006.01)
(Continued)

(52) U.S. Cl.
CPC .......... *F15B 11/161* (2013.01); *F15B 13/026* (2013.01); *F15B 13/027* (2013.01);
(Continued)

(58) Field of Classification Search
CPC .... F15B 11/161; F15B 13/026; F15B 13/027; F15B 13/022; F15B 18/00; F16K 11/07; F16K 31/426
(Continued)

(56) References Cited

U.S. PATENT DOCUMENTS 4,244,678 A * 1/1981 Uehara .................. F04B 49/002
417/218
5,271,227 A * 12/1993 Akiyama .............. E02F 9/2232
60/422
(Continued)

FOREIGN PATENT DOCUMENTS

EP    2 489 883 A1    8/2012
JP    H01 261502 A    10/1989
JP    2010 261196 A   11/2010

OTHER PUBLICATIONS

International Search Report and Written Opinion for corresponding Patent Application No. PCT/US2015/052954 dated Feb. 2, 2016.
(Continued)

*Primary Examiner* — Minh Le
(74) *Attorney, Agent, or Firm* — McDonnell Boehnen Hulbert & Berghoff LLP

(57) ABSTRACT

Exemplary control valves that may be configured as a load sense, closed-center, and/or open-center valve. The control valve may include optional individual valve force sensing to potentially allow an operator to smoothly operate devices operating on low-load work ports even when a variable displacement pump is inducing pressure to operate a device connected to a high-load work port of a separate valve or worksection in the same stack. This optional force sensing may be employed on any or all worksections associated with any valve stack, and may further be included on one or both workports for any given worksection. Each worksection may include parallel and variable paths of fluid supplied by (Continued)

the pump. Also, flow priority to one or more worksections or external valves in a corresponding hydraulic system is optional and can be customized using the variable flow path and a corresponding fixed restriction.

20 Claims, 20 Drawing Sheets

(51) Int. Cl.
    *F15B 13/02* (2006.01)
    *F16K 11/07* (2006.01)
    *F16K 31/42* (2006.01)
    *E02F 3/32* (2006.01)
    *E02F 9/22* (2006.01)

(52) U.S. Cl.
    CPC ............ *F16K 11/07* (2013.01); *F16K 31/426* (2013.01); *E02F 3/32* (2013.01); *E02F 9/2225* (2013.01); *E02F 9/2267* (2013.01); *F15B 2211/3105* (2013.01); *F15B 2211/3122* (2013.01)

(58) Field of Classification Search
    USPC ..... 137/596.17, 625.34, 625.69; 91/472, 532
    See application file for complete search history.

(56) References Cited

U.S. PATENT DOCUMENTS

| | | | |
|---|---|---|---|
| 5,768,973 A * | 6/1998 | Cochran | E02F 9/2225 91/516 |
| 5,921,165 A * | 7/1999 | Takahashi | E02F 9/226 91/426 |
| 5,996,623 A * | 12/1999 | Omberg | F15B 13/0402 137/596.13 |
| 8,215,107 B2 | 7/2012 | Pfaff et al. | |
| 10,001,146 B2 * | 6/2018 | Joung | F15B 11/024 |
| 2003/0037465 A1 | 2/2003 | Toji et al. | |
| 2006/0081299 A1 * | 4/2006 | Koo | F15B 13/021 137/625.69 |
| 2006/0137751 A1 * | 6/2006 | Steinhilber | F15B 13/0402 137/625.69 |
| 2011/0192474 A1 * | 8/2011 | Kobayashi | F15B 13/027 137/528 |
| 2011/0197576 A1 * | 8/2011 | Wada | E02F 9/2217 60/413 |
| 2013/0125539 A1 * | 5/2013 | Kobayashi | E02F 9/2207 60/413 |
| 2013/0160443 A1 | 6/2013 | Ballweg et al. | |
| 2015/0128583 A1 * | 5/2015 | Fujiwara | F15B 11/17 60/429 |
| 2015/0330416 A1 * | 11/2015 | Kojima | E02F 9/2239 60/484 |
| 2015/0361995 A1 * | 12/2015 | Joung | F15B 11/024 60/327 |
| 2015/0362084 A1 * | 12/2015 | Coolidge | F15B 11/042 137/625.48 |
| 2016/0201297 A1 * | 7/2016 | Jeon | F15B 13/0417 137/625.48 |
| 2018/0100521 A1 * | 4/2018 | Richer | F15B 11/161 |

OTHER PUBLICATIONS

International Preliminary Report on Patentability for corresponding Patent Application No. PCT/US2015/052954 dated Oct. 26, 2016.

* cited by examiner

DIRECTIONAL CONTROL VALVE

RELATED APPLICATIONS

This application is a national phase of International Application No. PCT/US2015/052954 filed Sep. 29, 2015, which claims the benefit of U.S. Provisional Application No. 62/057,209 filed Sep. 29, 2014, all of which are hereby incorporated herein by reference in their entireties.

FIELD OF INVENTION

The present invention relates generally to directional control valves, and more particularly to directional control valves with force sensing and flow priority.

BACKGROUND

Some control valves are open-center valves, which utilize fixed displacement pumps to induce a constant flow in a hydraulic system. The constant flow allows quick operation of devices, such as actuators, to be operated quickly at full speed. Any excess flow induced by the pump is routed back to a tank to be filtered and re-circulated by the pump. Generally multiple open-center valves are arranged together in a configuration called a valve stack and each open-center valve is manually controlled by an operator.

Some other control valves are closed-center valves, which utilize variable displacement pumps to minimize energy loss from a constantly running fixed displacement pump. The variable displacement pumps provide pressure to each closed-center valve without a need to route fluid to tank because the flow is minimized when the corresponding valve is not actuated. Similar to open-center valves, generally multiple closed-center valves are arranged together in a valve stack and controlled by an operator, but the valves are connected in a parallel arrangement to provide equal pressure for all valves.

Some closed-center valves utilize load sensing, which allows the variable displacement pump to reduce or increase fluid flow and pressure to match load requirements of the system.

SUMMARY OF INVENTION

Conventional open-center control valves waste energy from a fixed displacement pump constantly running to produce excess flow and pressure. Conventional closed-center valves are associated with significant time delay because a variable displacement pump must produce a desired pressure and flow to a workport of the corresponding close-center valve. Conventionally, open-center, and hybrid open center/load sense valves only have force sensing for the worksection possessing the maximum actuator load. Once that maximum load is moving, the valve assembly inlet pressure is high enough to move other loads and therefore disable other worksection force sensing of those prior valves. Thus, each valve with a lower load requirement experiences full pressure and an operator actuating one of the lower load valves would be less able to smoothly control operation of a device operating from a corresponding work port of the lower load valve. Also, those previous valves generally must have force sensing for both spool directions.

Therefore, exemplary control valves may be configured as a load sense, closed-center, and/or open-center valve. The control valve may include optional individual valve force sensing to potentially allow an operator to smoothly operate devices operating on low-load work ports even when a variable or fixed displacement pump is inducing pressure to operate a device connected to a high-load work port of a separate valve or worksection in the same stack. This optional force sensing may be employed on any or all worksections associated with any valve stack, and may further be included on one or both workports for any given worksection. In some exemplary embodiments, a worksection or a set of worksection bodies may be mono-casted or otherwise integral or of one body rather than being made of individually cast sections stacked together.

One or more worksections may include parallel and variable paths of fluid supplied by the pump, which may be metered into each worksection. For example, series, tandem, and/or parallel circuits may be available. Also, flow priority to one or more worksections or external valves in a corresponding hydraulic system is optional and can be customized using the variable and parallel flow paths. A corresponding hydraulic system may provide power beyond capability per parallel and variable paths.

One or more worksections may be configured to limit maximum output flow. For example, the worksection may be configured with control spool flow limitation. The worksection may include a pressure compensated flow control valve for controlling flow and regulating pressure from the inlet to the workport or workports. Alternatively or additionally, the worksection may include a fixed restriction for limiting maximum output flow from the inlet to the workport or workports.

One or more worksections may be configured as a three-position regenerative worksection that provides flow regeneration from one workport to another workport (instead of to tank), or from one workport to another workport and also to tank.

One or more worksections and/or an associated hydraulic system may include various other features, such as bypass compensator, priority flow divider with external or internal controlled flow (CF flow), margin control, pressure limited flow (PLQ), low pressure regeneration, thermal transfer, interties control, true workport load sense pressure signal (e.g., no intermediate or crossover pressure error), and/or control spool flow force compensation. The CF flow may be routed externally to another valve (e.g., a steering valve) or internally to feed the worksection.

One or more worksections and/or an associated hydraulic system may provide system flow sharing during pump output flow overdemand. Such a feature may be provided by variable path priority, fixed restriction, pressure compensated flow control, flow force compensation, low pressure regeneration, and/or worksection regeneration.

Exemplary valves may include valve bodies with like or identical features, and may be configured to provide the desired function by installation of the appropriate spool.

According to one aspect of the invention, a hydraulic system comprising a pressure source, a first worksection having a spool disposed in a spool bore of the first worksection, a second worksection having a spool disposed in a spool bore of the second worksection, a parallel flow pressure passage fluidly connecting the pressure source to the first and second worksections in parallel and opening into the spool bores of the worksections, and a variable flow path fluidly connecting the pressure source to the first and second worksections in series, the variable flow path having a first variable flow pressure passage fluidly connecting the pressure source to the spool bore of the first worksection, and a second variable flow pressure passage fluidly connecting the spool bore of the first worksection to the spool bore of the second worksection, wherein the first worksection includes a metered fluid chamber open to the spool bore of the first worksection, and wherein the spool of the first worksection is configured to selectively connect the parallel flow pressure passage and/or the first variable flow pressure passage to the metered fluid chamber.

According to another aspect of the invention, a force sensing hydraulic system comprising a pressure source, a reservoir, a first worksection having a spool disposed in a spool bore, a pressure passage fluidly connecting the pressure source to the first worksection and opening into the spool bore of the worksection, wherein the first worksection includes a metered fluid cavity open to the spool bore of the first worksection, wherein the first worksection includes a force sensing cavity open to the spool bore and to a drain passage fluidly connecting the force sensing cavity to the reservoir, wherein the spool of the first worksection is configured to selectively connect the pressure passage to the metered fluid cavity, and wherein the spool of the first worksection is configured to selectively meter flow from the metered fluid cavity to the force sensing cavity.

According to another aspect of the invention, stackable hydraulic worksection, or monoblock cast housing, comprising a body having opposite first and second mounting faces for mating with mounting faces of adjacent worksection bodies when the worksection bodies are stacked together along a stacking axis, a spool bore extending along a spool bore axis transverse to the stacking axis, a first flow passage opening into a first cavity of the spool bore and having an inlet port opening to the first mounting face and an outlet port opening to the second mounting face in alignment with the inlet port along the stacking axis such that, when the worksection bodies are stacked together along the stacking axis, an outlet port of the first flow passage abuts an inlet of a flow passage in a worksection body stacked against the second mounting face, wherein the spool bore includes a metered fluid cavity, and wherein the spool bore includes a force sensing cavity opening to a drain passage, the force sensing cavity being adjacent the metered fluid cavity and spaced apart from the metered fluid cavity by a land along the spool bore axis.

According to another aspect of the invention, a stackable hydraulic worksection, or monoblock cast housing, comprising a body having opposite first and second mounting faces for mating with mounting faces of adjacent worksection bodies when the worksection bodies are stacked together along a stacking axis, a spool bore extending along a spool bore axis transverse to the stacking axis, a first flow passage having an inlet port opening to the first mounting face and an outlet opening into a first cavity of the spool bore, a second flow passage having an inlet opening into a second cavity of the spool bore and an outlet port opening to the second mounting face in alignment with the inlet port of the first flow passage along the stacking axis such that, when the worksection bodies are stacked together along the stacking axis, an outlet port of the second flow passage abuts an inlet of a flow passage in a worksection body stacked against the second mounting face, wherein the first and second cavities are adjacent and spaced apart by a land along the spool bore axis, wherein the spool bore includes a metered fluid cavity adjacent the first cavity on the axial side opposite the second cavity and spaced apart from the first cavity by a land along the spool bore axis, and wherein the spool bore includes a force sensing cavity opening to a drain passage, the force sensing cavity being adjacent the metered fluid cavity on the axial side opposite the first cavity and spaced apart from the metered fluid cavity by a land along the spool bore axis.

According to another aspect of the invention, a stackable hydraulic worksection, or monoblock cast housing, comprising a body having opposite first and second mounting faces for mating with mounting faces of adjacent worksection bodies when the worksection bodies are stacked together along a stacking axis, a spool bore extending along a spool bore axis transverse to the stacking axis, a first flow passage opening into a first cavity of the spool bore and having an inlet port opening to the first mounting face and an outlet port opening to the second mounting face in alignment with the inlet port along the stacking axis such that, when the worksection bodies are stacked together along the stacking axis, an outlet port of the first flow passage abuts an inlet of a flow passage in a worksection body stacked against the second mounting face, a second flow passage having an inlet port opening to the first mounting face and an outlet opening into a second cavity of the spool bore, and a third flow passage having an inlet opening into a third cavity of the spool bore and an outlet port opening to the second mounting face in alignment with the inlet port of the second flow passage along the stacking axis such that, when the worksection bodies are stacked together along the stacking axis, an outlet port of the third flow passage abuts an inlet of a flow passage in a worksection body stacked against the second mounting face, wherein the second and third cavities are adjacent and spaced apart by a land along the spool bore axis.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles of this present application have particular application to high pressure hydraulic circuits and controlling pressure and flow from hydraulic circuits, such as operating a hydraulic cylinder of a hydraulic machine (for example, an excavator), and thus will be described below chiefly in this context. It will of course be appreciated, and also understood, that principles of this invention may be applicable to other hydraulic circuits where it is desirable to control flow or pressure, such as, for example, construction equipment, refuse trucks, forestry vehicles, snow management vehicles, and the like.

Figure 1:
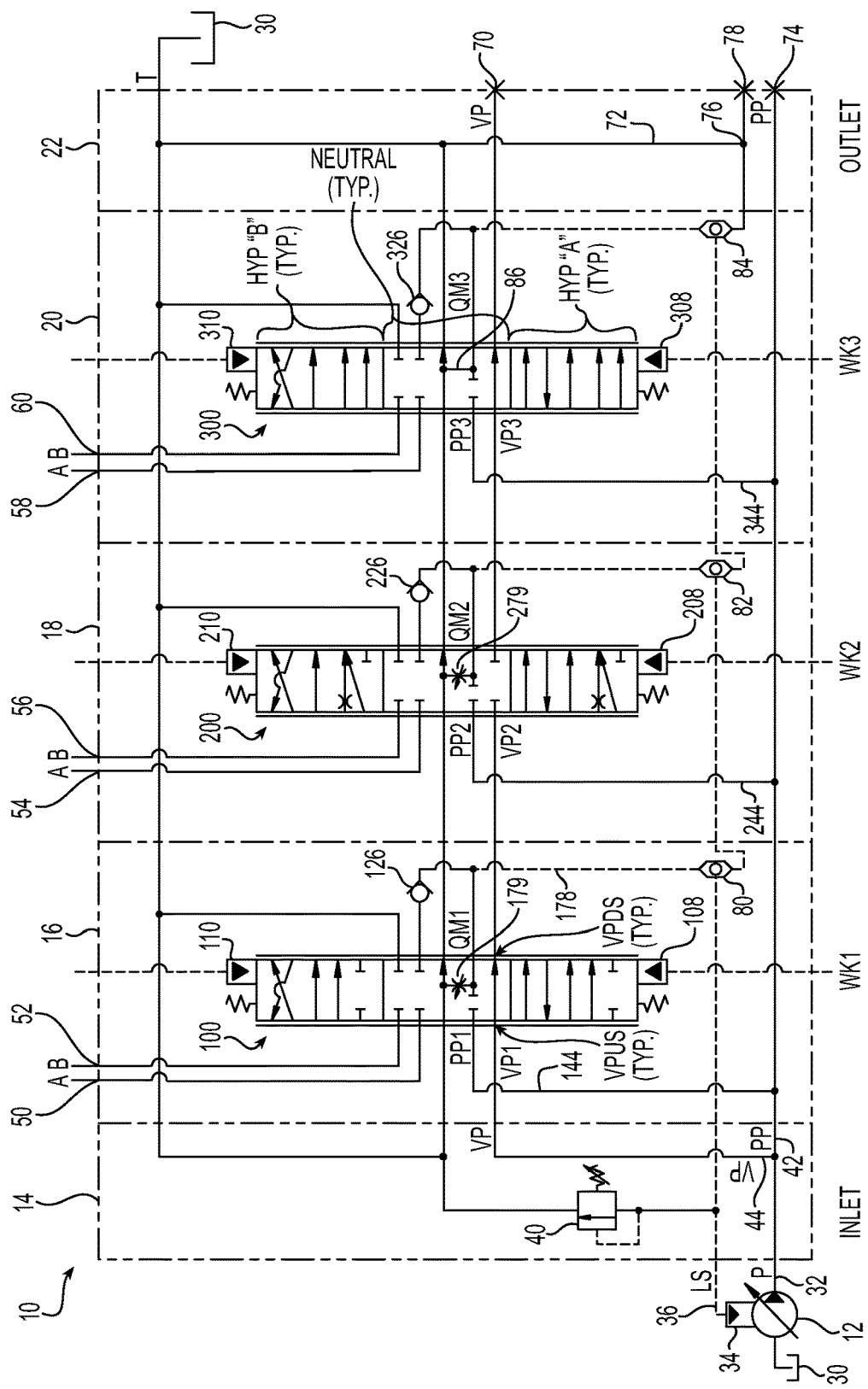
FIG. 1 shows a schematic diagram of an exemplary hydraulic system including an exemplary control valve.

Referring now in detail to the drawings, and initially to FIG. 1, a hydraulic system including an exemplary control valve is designated generally by reference numeral 10. It is noted that the illustrated hydraulic system is provided for illustration purposes to show some options possible with exemplary worksections, and it will be understood that the illustrated system would not necessarily be used, as illustrated, for any particular job or on any particular hydraulic machine. The hydraulic system 10 includes a pressure source 12, such as a variable displacement pump or a fixed displacement pump (in this case, for example, a load-sense variable displacement pump), an inlet section 14, a first worksection 16, a second worksection 18, a third worksection 20, and an outlet section 22. In other exemplary embodiments, more than three worksections are utilized. In other embodiments, less than three worksections are utilized. In one example, only one exemplary worksection may be provided, while in another, every hydraulic function of a backhoe has an associated exemplary worksection.

The pressure source 12 may receive fluid from a reservoir 30 to provide the fluid to the inlet section 14 through an inlet passage 32. The outlet section 22 may receive excess fluid from any of the inlet section 14, the first worksection 16, the second worksection 18 and/or the third worksection 20. The outlet section 22 may provide the excess fluid to the reservoir 30 for later use by the pressure source 12.

It is noted that the exit port is shown blocked and the worksection load sense check valve adjacent to the outlet section has an input port internally connected to the "T" (tank) port. Conversely, the input port could bypass the "T" port and the exit port 70 could be open. A load sense pressure signal from an external source could be connected to the port 78 and therefore the load sense check input port, assuming the input port is disconnected from the "T" port. In other words, this exemplary set of worksections may be connected to other hydraulic controls (other worksections, exemplary and/or conventional) or may be self-contained.

A 3-way load sense check or shuttle type system is shown with a shuttle valve 80, 82, 84. In another embodiment, a 2-way load sense check valve system with a single quiescent load sense vent may also be used. Alternatively, no load sense check system may be used.

The pressure source 12 may be a load sense margin pressure source controlled by a pilot port 34. For example, the pressure source 12 may receive a load signal from a load sense passage 36, and supply a pressure equal to the sensed pressure plus a margin pressure. The load signal may, therefore, be at least as high as the highest load required of any of the worksections 16, 18, 20, but the inlet section 14 may include a relief valve 40 fluidly connected to the load sense passage 36 to limit the load signal to a predetermined maximum and provide excess fluid to the reservoir 30. Limiting the load signal may allow the pressure source 12 to operate with less risk of wear or damage to the pressure source 12 or other components within the worksections 16, 18, 20. The relief valve 40 also may limit the maximum pressure of the entire system.

The inlet section 14 receives fluid from the pressure source 12 through the inlet passage 32. The fluid is split within the inlet section 14 into a parallel flow pressure passage 42 and a variable flow path 44.

The parallel flow pressure passage 42 connects in parallel to and provides equal pressure to each worksection 16, 18, 20. For example, the parallel flow pressure passage 42 may open into the spool bore of the worksection 16.

Each worksection 16, 18, 20 may be configured to meter pump supply flow to a corresponding first workport 50, 54, 58 and/or second workport 52, 56, 60.

The variable flow path 44 may provide flow from the pressure source 12 in series to each worksection 16, 18, 20, thereby providing prioritized flow to the first worksection 16 and to subsequent worksections 18, 20 depending on the configuration of the worksections 16, 18, 20. The variable flow path 44 may carry fluid flow ranging from zero to the entire output flow of the pressure source 12, depending on the configuration and restrictiveness of the variable flow path 44. The worksection 16, 18 or worksections 16, 18 that are upstream of one or more downstream worksections 18, 20 will have priority to receive pump supply flow. Priority is a function of the variability. For example, the upstream first worksection 16 can be actuated enough to block pump flow to both of the downstream worksections 18, 20.

Each worksection 16, 18, 20 may have a variable path upstream cavity 158, 258, 358 connected to a corresponding spool bore 102, 202, 302. Each worksection 16, 18, 20 may draw upstream variable path flow from the variable flow path 44 if that worksection is arranged accordingly and if the previous worksection is configured to allow the variable flow path 44 to continue. Each spool 102, 202, 302 can be configured to meter pump supply flow to either workport 50, 52 or both workports 50, 52.

The parallel flow path 42 is shown blocked at point 74 but it can be open so that parallel flow path 42 flow can be connected. Or, as expressed in the art, parallel flow path 42 flow could have a "power beyond" connection to another valve assembly of this new type or another valve.

The variable flow path 44 is shown blocked at point 70 but it can be open so that variable flow path 44 flow could be connected to the reservoir 30 to convert the valve assembly to an open center type. Or, as commonly expressed, the variable flow path 44 flow could have a "power beyond" connection to another valve assembly of this new type or another valve.

In an embodiment, the variable flow path 44 may return to the port line 72, port. However, if an upstream worksection in the neutral position blocks downstream variable flow path 44 flow, then the valve assembly may not be an open-center type.

Alternatively, the worksection 16 can be partially actuated so that it creates a pressure differential to restrict downstream flow to the worksections 18, 20. Downstream worksections 18, 20 may be configured so that the flow through the variable flow path 44 is a component of the metered flow of the worksections 16, 18, 20. Alternatively the variable flow path 44 may be a component of the metered flow of another valve assembly (not shown).

Figure 2:
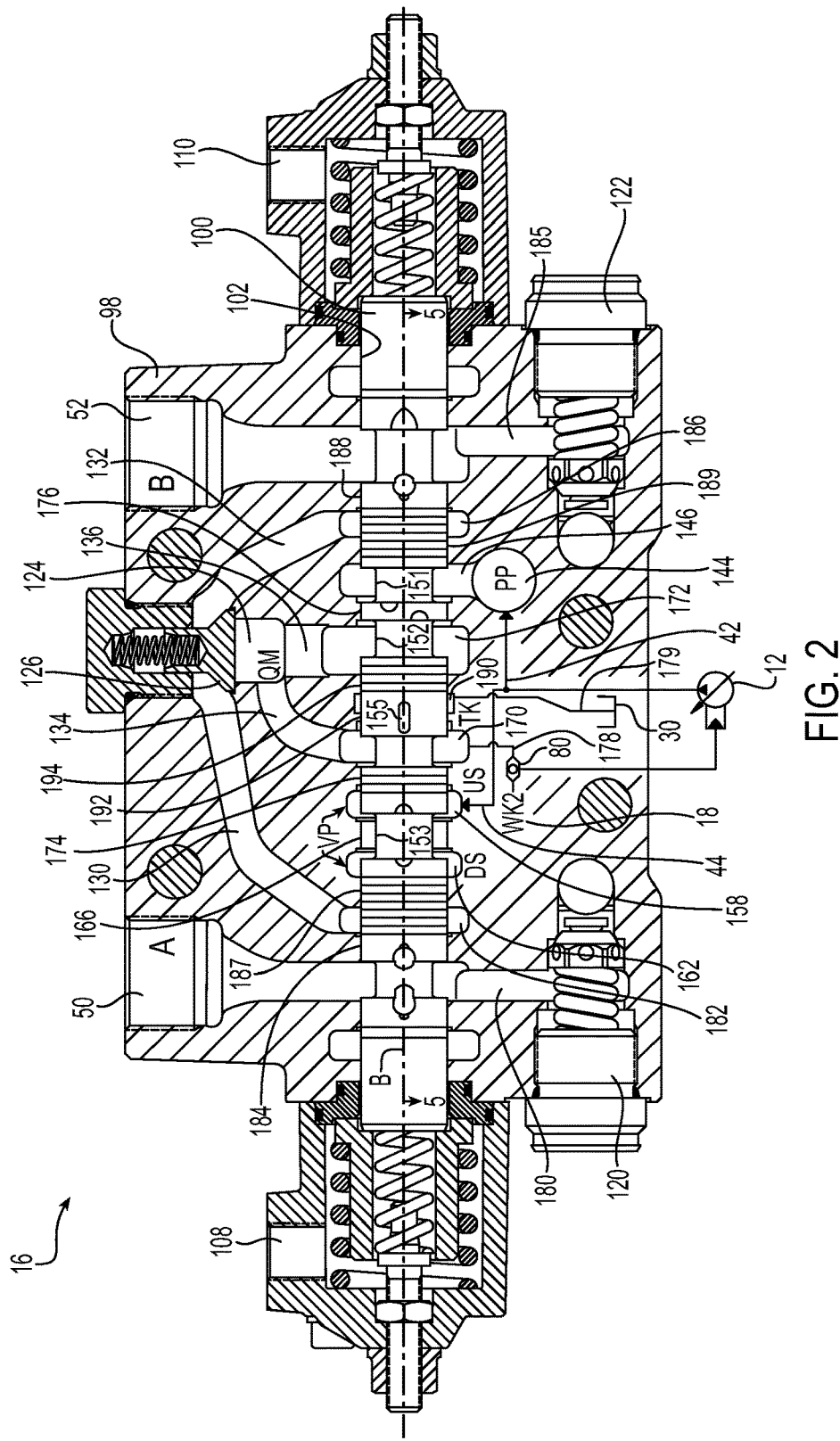
FIG. 2 shows a cross-section of an exemplary first worksection of the control valve of FIG. 1.
Figure 3:
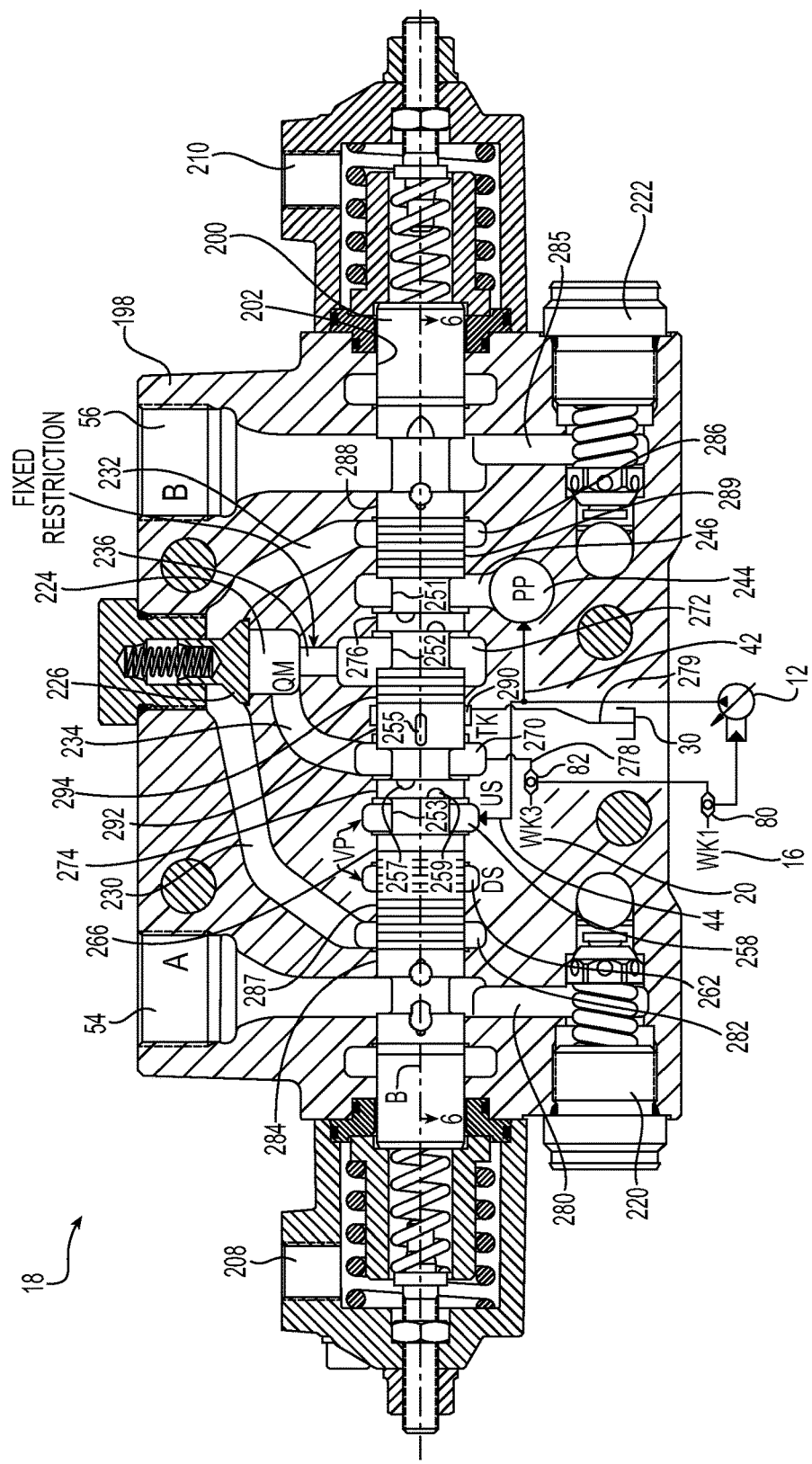
FIG. 3 shows a cross-section of an exemplary second worksection of the control valve of FIG. 1.

Referring now to FIGS. 1, 2 and 3, the first worksection 16 may include a body 98, a spool 100 disposed in a spool bore 102 of the body 98, a first workport 50, a second workport 52, a first pilot port 108, a second pilot port 110, a first relief valve 120, a second relief valve 122. The pilot ports 108, 110 allow hydraulic remote actuation. In other embodiments, manual and/or electrohydraulic solenoid actuation may be used.

The body 98 has opposite first and second mounting faces 140, 142 for mating with mounting faces of adjacent worksection bodies when the worksection bodies are stacked together along a stacking axis A. The illustrated example schematically shows the second mounting face 142 mating with worksection 18. In other exemplary embodiments, a set of worksection bodies may be mono-casted or otherwise integral or of one body rather than being made of individually cast sections stacked together.

The spool bore 102 of the body 98 extends along a spool bore axis B transverse to the stacking axis A. Thus, when the worksections 16, 18, 20 are stacked along the stacking axis A movement of the spool 100 along the spool bore does not intersect with any other worksection 18, 20.

The parallel flow pressure passage 42 fluidly may connect the pressure source 12 to the first and second worksections 16, 18 in parallel. For example, parallel flow pressure passage 42 may be a channel formed by one or more consecutive bores extending parallel to the stacking axis A through each worksection 16, 18, 20.

The body 98 may include a metered fluid chamber 124 open to the spool bore of the first worksection 16. The metered fluid chamber 124 may receive fluid from the spool bore 102 prior to the fluid flowing to one of the work ports 50, 52. Pump flow may be metered up to this point and may be directed to a workport 50, 52. The metered fluid chamber 124 is downstream of the parallel pressure passage 144 and the variable pressure passage 154. Load sense, LS, pressure may be sensed at the metered fluid chamber 124. Qmet (Q=flow and "met"=metered) flow is the result of the sum of any flow from the variable flow path 44 and the parallel flow path 42 minus any flow used for force sensing.

The body may include a parallel pressure cavity 146, a variable upstream cavity 158, a variable downstream cavity 162, a metered cavity 170, a metered cavity 172, a workport cavity 180, a metered cavity 182, a workport cavity 185, a metered cavity 186, and a load sensing cavity 190.

The metered fluid chamber 124 may be fluidly connected to metered cavities 170, 172 of the spool bore 102. For example, the cavities 170, 172 extend circumferentially about the spool bore axis 6 and the body may include a land 194 between the metered passages 170, 172 to abut the spool 100 and prevent mixing of flow between the metered passages 170, 172 via the spool bore. Also, the body 98 may include a metered passage 134 to fluidly connect the metered cavity 170 to the metered flow chamber 124 independently of the metered cavity 172.

The body 98 may include a fluid passage 136 disposed between the metered fluid chamber 124 and the metered cavity 172 to allow fluid flow from the parallel pressure passage 144 to the work ports 50, 52. In an embodiment, the fluid passage is a fluid restriction for restricting flow from the first flow passage to the workports.

A check valve 126 may be disposed between the metered fluid chamber 124 and one of or both workports 50, 52 such that flow from a workport 50, 52 to the metered fluid chamber is prevented. The check valve 126 may be a load check valve with a minimum pressure setting based on a required fluid pressure of one or both of the workports 50, 52. The check valve 126 is downstream of the metered fluid chamber 124. The check valve 126 may prevent reverse flow from an actuator attached to one of the workports 50, 52 toward the pressure source 12 in case of pump failure or supply line rupture. Also a closed check may be used to support an actuator load as the spool 100 is actuated until increasing inlet pressure can move a corresponding load. In other embodiments, the check valve could be replaced by a pressure compensated flow control for maximum output flow limitation (shown in FIG. 12, for example).

The body 98 may include a variable pressure passage 154 fluidly connected in series with the variable flow path 44 with an inlet port 156 fluidly connected to the variable upstream cavity 158. Depending on the spool 100 configuration and position, the variable upstream cavity 158 may fluidly connect to the variable downstream cavity 162 through a variable pressure passage 160. The variable pressure passage 160 may extend to an outlet port 164. If fluid flows through to the outlet port 164, the flow may be free, metered, or blocked as the spool 100 transitions from neutral to another position, depending on the configuration of the spool 100 and spool bore 102.

The spool 100 may be disposed in the spool bore 102 to actuate along the spool bore axis B and control flow through the work section 16. The spool 100 of the first worksection 16 may be configured to selectively connect the parallel flow pressure passage 42 to the metered fluid chamber 124. The spool 100 may abut the land 176 while in a neutral position to prevent flow between the parallel pressure cavity 146 and the metered flow chamber 124. The spool 100 may include a partial bore or undercut 151 extending axially along the spool bore axis B wider than the land 176 to allow fluid flow from the parallel pressure cavity 146 to the metered flow chamber 124 and to the work port 52 when the spool is actuated by the pilot port 110.

The spool may include an undercut 152 extending along the spool axially along the spool bore axis B wider than the land 176 to allow fluid flow from the parallel pressure cavity 146 to the metered flow chamber 124 and to the work port 50 when the spool is actuated by the pilot port 108.

The undercuts 151, 152 are shown fluidly disconnected from one another to prevent fluid from flowing from the parallel pressure cavity 146 when neither undercut 151, 152 extends over the land 176 to the metered flow cavity 172 and the parallel pressure cavity 146.

The spool 100 of the first worksection 16 may be configured to meter flow from the parallel flow pressure passage 42 to the metered fluid chamber 124. For example, the spool is movable and as the spool 100 moves along the spool bore axis B in one direction or another to fluidly connect the parallel pressure cavity 146 to the metered fluid chamber 124, fluid flow may increase as the spool 100 continues to move in the same direction. Conversely, fluid flow may decrease as the spool 100 moves in the opposite direction. Once the spool 100 reaches the neutral position flow from the parallel pressure cavity 146 to the metered fluid chamber 124 may stop. Continuing to move the spool 100 in the opposite direction may have the same effect on fluid flow, but the flow is provided to the other workport 50, 52.

The spool 100 of the first worksection 16 is configured to selectively meter flow from the metered fluid cavity 170 to the force sensing cavity 190. The spool 100 includes a slot 155 configured to extend along the spool bore axis B further than a corresponding land 192. In the neutral position, the slot 155 may straddle the land 192 to provide a fluid connection between the force sensing cavity 190 and the metered fluid cavity 170 (thereby reducing pressure in the chamber 124 caused by flow from the metered fluid cavity 172). When the spool is actuated in one direction or the other, the fluid flow between the slot 155 and the land 192 may decrease, thereby reducing fluid flow to the reservoir 30 through a drain line 179. The decreasing fluid flow allows the fluid pressure in the metered fluid chamber 124 to increase based on the position of the spool to provide individualized force sensing of the hydraulic function associated with worksection 16. Fluid flow may stop once the spool is moved further in the same direction. Thus, fluid flow to the reservoir 30 from the metered fluid chamber 124 would cease allowing full pressure from the parallel pressure passage 144 and/or variable pressure passage 154 to build up in the metered fluid chamber 124 to provide to either workport 50, 52.

Force sensing is a method to allow a machine operator to recognize and control a higher actuator load. It may be accomplished by creating a variable workport output flow start of meter point. Spool actuation and start to meter position from the neutral spool position may increase with machine actuator load. Increasing spool actuation restricts the Qmet flow to reservoir 30 flow to elevate the worksection Qmet pressure to the point an actuator connected to the operating workport 50, 52 moves against a corresponding load.

Exemplary force sensing is optional and can be arranged as the spool 100 transitions from neutral to the first or second position or both positions. The word "Individual" is used because each worksection, even if it is not controlling the maximum actuator load, can have force sensing, unlike in conventional systems.

The spool bore 102 may include the parallel pressure cavity 146 adjacent to the land 176, which is adjacent to the metered flow cavity 172. The metered cavity 186 may be adjacent a land 189 that is adjacent the parallel flow cavity 146 opposite the land 176. A land 188 may be adjacent the metered cavity 186 opposite the land 189 and the workport cavity 185 may be adjacent the land 188 opposite the metered cavity 186. The workport cavity 185 may fluidly connect to the workport 52.

The spool bore 102 may include a land 194 adjacent the metered fluid cavity 172 and the load sense cavity 190 opposite the metered flow cavity 172. The metered flow cavity 170 may be adjacent the load sense cavity 190 and separated by a land 192 and the variable upstream cavity 158 may be adjacent the metered flow cavity 170 separated by a land 174. A land 166 may be adjacent the variable upstream cavity 158 and the variable downstream cavity 162 that is opposite the variable upstream cavity 158. The variable downstream cavity 162 may be adjacent a land 187 that is adjacent the metered cavity 186 opposite the land 187. A land 184 may be adjacent the metered cavity 182 opposite the land 187 and the workport cavity 180 may be adjacent the land 184 opposite the metered cavity 182. The workport cavity 180 may fluidly connect to the workport 50.

The spool bore 102 may be configured to selectively fluidly connect the parallel pressure cavity 146 to the metered cavity 172. For example, when the spool 100 is actuated in one direction or another, the fluid may flow through either undercut 151 or undercut 152 to the metered cavity 172.

The spool 100 of the first worksection 16 may be configured to selectively connect the pressure passage 144 to the metered fluid cavity 172. For example, as the spool 100 moves in one direction or another a cross sectional area of fluid flow may open through the undercut 151 or the undercut 152. The cross-sectional area may increase as the spool continues to move in the same direction. A maximum cross-sectional area may be a function of the difference of the axial lengths of the undercut 151 and the land 176. The cross-sectional area may also be a function of the metering notches extending from the various undercuts 151, 152. Also, the maximum cross-sectional area may be a function of the undercut depth of the corresponding undercut 151 or undercut 152, and/or the circumferential width of the undercut.

The parallel flow passage 144 may provide flow from the parallel flow pressure passage 42 opening into the parallel flow cavity 146 of the spool bore 102 and having an inlet port 148 opening to the first mounting face 140 and an outlet port 150 opening to the second mounting face 142 in alignment with the inlet port 148 along the stacking axis A such that, when the worksection bodies 98, 198, 298 are stacked together along the stacking axis A, an outlet port 150 of the first flow passage 144 abuts an inlet port 248, 348 of a flow passage 244, 344 in a worksection body 198, 298 stacked against the second mounting face 142. Aligning the inlet port 148 and the outlet port 150 allows each worksection to have a body with the same general shape and size to easily stack in a modular manner. Also, each work section 16, 18, 20 may be selectively re-arranged, removed, or added while retaining functionality of the stack.

In the neutral position, the spool 100 blocks flow from the pressure passage 144 to the metered fluid cavity 170 and provides a first flow area from the metered fluid cavity 170 to the force sensing cavity 190.

In the first displaced position, the spool 100 allows flow from the pressure passage 144 to the metered fluid cavity 170 and provides a second flow area from the metered fluid cavity 170 to the force sensing cavity 190 that is less than the first flow area.

In the second displaced position, further than the first position, the spool 100 allows flow from the pressure passage 144 to the metered fluid cavity 170 and blocks flow from the metered fluid cavity 170 to the force sensing cavity 190.

In the pressure passage 144, the parallel flow pressure passage 42 is fluidly connecting the pressure source 12 to the first and second worksections 16, 18 in parallel and opening into the spool bores 102, 202 of the worksections 16, 18. As mentioned above, the parallel flow pressure passage 42 may extend through each worksection 16, 18, 20 to fluidly connect each in parallel.

The upstream variable flow passage 154 may have an inlet port 156 opening to the first mounting face 140 and an outlet opening into a second cavity 158 of the spool bore 102.

In the neutral position, the spool 100 blocks flow from the pressure passage 154 to the metered fluid cavity 170 and provides a first flow area from the metered fluid cavity 170 to the force sensing cavity 190.

In the first displaced position, the spool 100 blocks flow from the pressure passage 154 to the metered fluid cavity 170 and provides a second flow area from the metered fluid cavity 170 to the force sensing cavity 190 that is less than the first flow area. The first displaced position may be in either direction along the spool bore axis B.

In the second displaced position, further than the first position, the spool 100 blocks flow from the pressure passage 154 to the metered fluid cavity 170 and blocks flow from the metered fluid cavity 170 to the force sensing cavity 190. Blocking fluid flow allows full pressure from the parallel pressure passage 144 to reach the metered fluid chamber 124 to potentially provide the full pressure to either workport 50, 52.

The pressure passage 154 is a variable flow path 44 fluidly connecting the pressure source 12 to the worksections 16, 18 in series. The variable flow path 44 may include the first variable flow pressure passage 154 fluidly connecting the pressure source 12 to the spool bore 102 of the first worksection 16, and a second variable flow pressure passage 254, of the second worksection 18, fluidly connecting the spool bore 102 of the first worksection 16 to the spool bore 202 of the second worksection 18.

The first variable flow pressure passage 154 may fluidly connect the pressure source 12 to the spool bore 102 of the first worksection 16, while the second variable flow pressure passage 160 fluidly connects the spool bore 102 of the first worksection 16 to the spool bore 202 of the second worksection 18.

The downstream variable flow passage 160, adjacent the second flow passage may have an inlet opening into a variable downstream cavity 162 of the spool bore 102, and an outlet port 164 opening to the second mounting face 142 in alignment with the inlet port 156 of the second flow passage 154 along the stacking axis A. When the worksection bodies 98, 198, 298 are stacked together along the stacking axis A, the outlet port 164 of the downstream variable flow passage 160 may abut an inlet port 256, 356 of a flow passage 254, 354 in a worksection body 198, 298 stacked against the second mounting face 142. In other words, the respective variable flow pressure passages 154, 254, 354 may be aligned such that each outlet port 164 is aligned with the inlet port 256, 356 of the next worksection 18, 20 in the stack. Alignment of the inlet and outlet ports may occur in combination with or independent of alignment of the inlet and outlet ports 148, 150.

The variable upstream and downstream cavities 158, 162 may be adjacent and spaced apart by the land 166 along the spool bore axis B. The land allows selectively fluidly connecting the cavities 158, 162 to one another. For example, the spool bore 102 may be configured to selectively fluidly connect the variable upstream cavity 158 to the variable downstream cavity 162. The corresponding undercut 153 may have an axial length greater than the land 166 to allow fluid flow between the two cavities 158, 162.

In the neutral position, the spool 100 allows flow from the variable upstream cavity 158 to the variable downstream cavity 162. In the first displaced position (e.g., shifted partially to the right), the spool 100 may meter flow from the variable upstream cavity 158 to the variable downstream cavity 162. In the second displaced position (e.g., shifted partially to the left), the spool 100 may meter flow from the variable upstream cavity 158 to the variable downstream cavity 162.

In the third displaced position (e.g., shifted fully to the right), the spool 100 may block flow from the variable upstream cavity 158 to the variable downstream cavity 162.

In the fourth displaced position (e.g., shifted fully to the left), the spool 100 may block flow from the variable upstream cavity 158 to the variable downstream cavity 162.

The force sensing cavity 190 may be open to the spool bore 102 and to a drain passage 179 fluidly connecting the force sensing cavity 190 to the reservoir 30.

The metered flow cavity 170 may be adjacent to and spaced apart from the variable upstream cavity 158 by the land 174 along the spool bore axis B.

In the first displaced position, the spool 100 may block flow from the variable upstream cavity 158 to the metered flow cavity 170.

In the second displaced position, the spool 100 may block flow from the second cavity 158 to the metered flow cavity 170.

The load sense passage 178 may open into the metered flow cavity 170. The load sense passage 178 allows a load signal to travel through a shuttle valve 80 to provide the pilot port 34 with a maximum load of the stack of worksections 16, 18, 20.

The metered flow cavity 172 is adjacent to and spaced apart from the parallel pressure cavity 146 by a land 176 along the spool bore axis B. In the neutral position, the spool 100 may block flow from the parallel pressure cavity 146 to the metered flow cavity 172. In the first displaced position, the spool 100 may meter flow from the parallel pressure cavity 146 to the metered flow cavity 172. In the second displaced position, the spool 100 may meter flow from the parallel pressure cavity 146 to the metered flow cavity 172.

The first workport 50 may open into the workport cavity 180. The workport cavity allows fluid to flow to the workport 50 and for excess pressure to be relieved through the relief valve 120.

A fluid passage 130 may connect the metered fluid chamber 124 to a metered cavity 182 adjacent to and spaced from the workport cavity 180 by a land 184 along the spool bore axis B.

In the neutral position, the spool 100 may block flow to the workport cavity 180 from the metered cavity 182. In the first position, the spool 100 may allow flow to the workport cavity 180 from the metered cavity 182. In the second position, the spool 100 may block flow to the workport cavity 180 from the metered cavity 182. In an opposite first position, the spool 100 may block flow to the workport cavity 180 from the metered cavity 182. In an opposite second position, the spool may allow flow to the workport cavity 180 from the metered cavity 182.

The second workport 52 may open into the workport cavity 185. The workport cavity 185 allows fluid to flow to the workport 52 and for excess pressure to be relieved through the relief valve 122.

A fluid passage 132 may connect the metered fluid chamber 124 to a metered cavity 186 adjacent to and spaced from the workport cavity 185 by a land 188 along the spool bore axis B.

In the neutral position, the spool 100 may block flow to the workport cavity 185 from the metered cavity 186. In the first displaced position, the spool 100 may allow flow to the workport cavity 185 from the metered cavity 186. In the second position, the spool 100 may block flow to the workport cavity 185 from the metered cavity 186.

The force sensing cavity 190 may open to the drain passage 179. The drain passage 179 allows the fluid flowing into the force sensing cavity 190 to be drained to the reservoir 30 to remove pressure from the metered fluid chamber 124, thereby potentially allowing individual force sensing for each worksection 16, 18, 20. The force sensing cavity 190 may be adjacent the metered fluid cavity 170 and spaced apart from the metered fluid cavity 170 by a land 192 along the spool bore axis B. The force sensing cavity 190 may open to a drain passage 179, the force sensing cavity 190 being adjacent the metered fluid cavity 170 on the axial side opposite the first cavity 158 and spaced apart from the metered fluid cavity 170 by a land 192 along the spool bore axis B.

The body 98 may have the opposite first and second mounting faces 140, 142 for mating with mounting faces of adjacent worksection bodies 198, 298 when the worksection 16, 18, 20 bodies are stacked together along a stacking axis A.

The parallel pressure passage 144 may open into a first cavity 146 of the spool bore 102 and having an inlet port 148 opening to the first mounting face 140. The parallel pressure passage 144 may include an outlet port 150 opening to the second mounting face 142 in alignment with the inlet port 140 along the stacking axis A. Aligning the inlet port 140 and the outlet port 150 allows the worksection bodies 98, 198 to be stacked together along the stacking axis A. The outlet port 150 of the first flow passage 144 may abut an inlet port 248 of a flow passage in the next worksection body 198 stacked against the second mounting face 142. As mentioned above, aligning the parallel pressure passages 144 may be independent of or independent of alignment of the variable pressure ports 156, 164.

Such a configuration of the first worksection 16 illustrated in the exemplary embodiment may provide for metered flow from the parallel passage 144 to the metered fluid chamber 124, but may not provide metered flow from the variable upstream cavity 158 to the metered fluid chamber 124. In the illustrated embodiment, the first worksection 16 does not include a fixed restriction. The first worksection 16 may meter and eventually block variable path flow to variable path downstream cavity 162 to provide priority over downstream flow. Optionally, the first worksection 16 may include force sensing which may meter flow from the metered fluid chamber 124 to the tank (T), or reservoir 30, which may depend on a position of the spool (e.g., per transitioning to workports 50 and 52).

Various additional embodiments of exemplary hydraulic systems, exemplary control valves, and/or exemplary worksections are illustrated in FIGS. 3-4 and 8-19, as described in further detail below. The various additional embodiments of the exemplary hydraulic systems, exemplary control valves, and/or exemplary worksections may be substantially the same as or similar to the above-described hydraulic system 10, control valve, and/or working section 16, and consequently structures corresponding to the same or similar structures will use the same or similar reference numerals, but with: a prefix "2" added in FIG. 3; a prefix "3" added in FIG. 4; a prefix "5" added in FIG. 8; a prefix "6" added in FIGS. 9 and 10; a prefix "7" added in FIG. 11; a prefix "8" added in FIG. 12; a prefix "9" added in FIG. 13; a prefix "10" added in FIG. 14; a prefix "11" added in FIG. 15; a prefix "12" added in FIG. 16; a prefix "13" added in FIG. 17; a prefix "14" added in FIG. 18; and a prefix "15" added in FIG. 19. In addition, the foregoing description of the exemplary hydraulic system 10, exemplary control valve, and/or exemplary worksection 16 is equally applicable to the exemplary hydraulic systems, exemplary control valves, and/or exemplary worksections described below, except where noted. For example, it is understood that the flow paths and pressures that govern the hydraulic systems, control valves, and/or worksections described below may be different from those described above. Moreover, it will be appreciated upon reading and understanding the specification that aspects of the various hydraulic systems, control valves, and/or worksections may be substituted for one another or used in conjunction with one another where applicable.

Second Worksection

Figure 5:
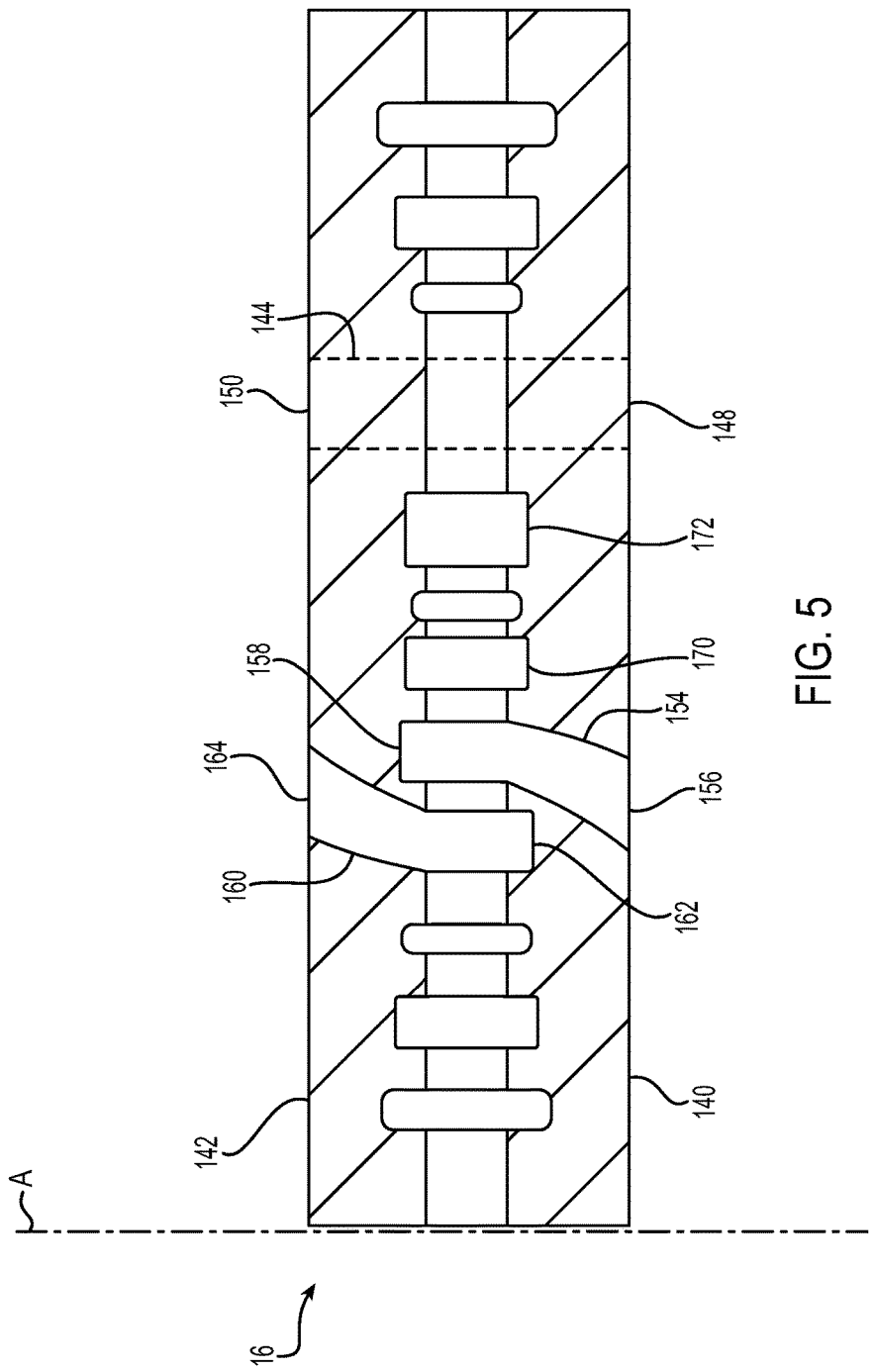
FIG. 5 shows a cross-section of the exemplary first worksection of FIG. 2.
Figure 6:
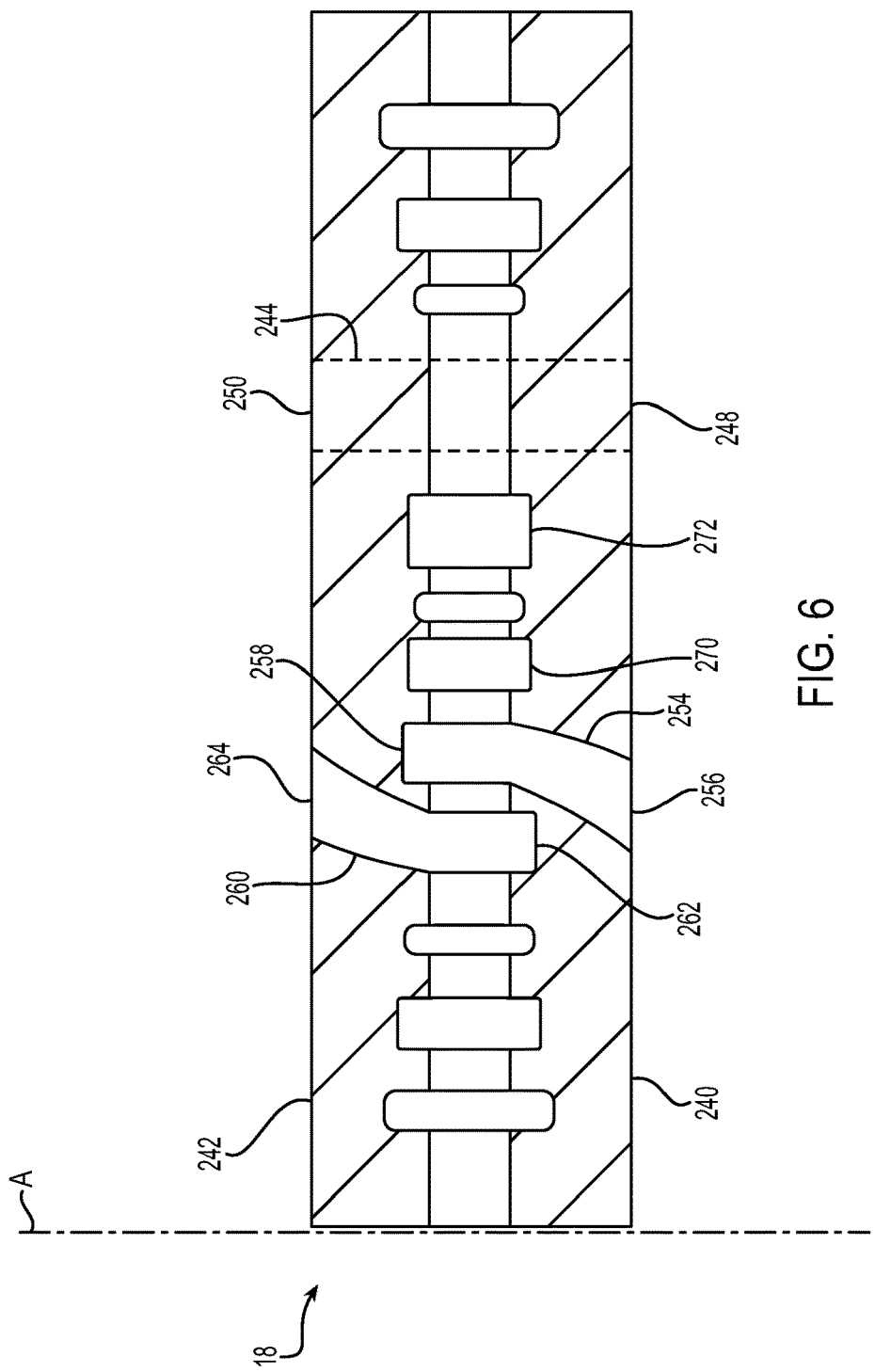
FIG. 6 shows a cross-section of the exemplary second worksection of FIG. 3.

Referring now to FIGS. 1, 3, and 6, the second worksection 18 may include a valve body 198 similar to the valve body 98 (FIGS. 2 and 5), but a different spool 200. The worksection 18 may include a first workport 54, a second workport 56, a first pilot port 208, a second pilot port 210, a first relieve valve 220, a second relief valve 222. The pilot ports 208, 210 allow hydraulic remote actuation. In an embodiment, manual and/or electrohydraulic solenoid actuation is used.

The body 198 has opposite first and second mounting faces 240, 242 for mating with mounting faces of adjacent worksection bodies when the worksection bodies are stacked together along a stacking axis A. The currently example schematically illustrates the second mounting face 242 mating with worksection 20 and the first mounting face 240 mating with the worksection 16.

The spool bore 202 of the body 198 extends along a spool bore axis B transverse to the stacking axis A. Thus, when the worksections 16, 18, 20 are stacked along the stacking axis A movement of the spool 200 along the spool bore 202 does not intersect with any other worksection 16, 20.

The parallel flow pressure passage 42 may fluidly connect the pressure source 12 to the first, second and third worksections 16, 18, 20 in parallel. For example, parallel flow pressure passage 42 may be a bore extending parallel to the stacking axis A through each worksection 16, 18, 20.

The body 198 may include a metered fluid chamber 224 open to the spool bore of the second worksection 18. The metered fluid chamber 224 may receive fluid from the spool bore 202 prior to the fluid flowing to one of the work ports 54, 56. Pump flow may be metered up to this point and may be directed to a workport 54, 56. The metered fluid chamber 224 is downstream of the parallel pressure passage 244 and the variable pressure passage 254. Load sense, LS, pressure may be sensed at the metered fluid chamber 224. Qmet flow is the result of the sum of any flow from the variable flow path 44 and the parallel flow path 42 minus any flow used for force sensing.

The body 198 may include a parallel pressure cavity 246, a variable upstream cavity 258, a variable downstream cavity 262, a metered cavity 270, a metered cavity 272, a workport cavity 280, a metered cavity 282, a workport cavity 285, a metered cavity 286, and a load sensing cavity 290.

The metered fluid chamber 224 may be fluidly connected to metered cavities 270, 272 of the spool bore 202. For example, the cavities 270, 272 extend circumferentially about the spool bore axis B and the body may include a land 294 between the metered passages 270, 272 to abut the spool 200 and prevent mixing of flow between the metered passages 270, 272 except for in the metered flow chamber 224. Also, the body 198 may include a metered passage 234 to fluidly connect the metered cavity 270 to the metered flow chamber 224 independently of the metered cavity 272.

The body 198 may include a fixed fluid restriction 236 disposed between the metered fluid chamber 224 and the metered cavity 272 to allow restricted fluid flow from the parallel pressure passage 244 to the work ports 54, 56. The fixed restriction is optional to restrict fluid flow from the parallel flow path 244. The fixed fluid restriction 236 may be downstream of the metered cavity 272. The fixed fluid restriction may be upstream of a load sense point and the check valve 226. The restriction 236 may allow assistance for maximum output flow limitation, flow priority, and system flow sharing in the neutral to first or second spool 200 positions. In an embodiment, the fluid restriction is either a variable fluid restriction or a free flow passage.

A check valve 226 may be disposed between the metered fluid chamber 224 and one of or both workports 54, 56 such that flow from a workport 54, 56 to the metered fluid chamber is prevented. The check valve 226 may be a load check valve with a minimum pressure setting based on a required fluid pressure of one or both of the workports 54, 56. The check valve 226 is downstream of the metered fluid chamber 224. The check valve 226 may prevent reverse flow from an actuator attached to one of the workports 54, 56 toward the pressure source 12 in case of pump failure or supply line rupture. Also a closed check may be used to support an actuator load as the spool 200 is actuated until increasing inlet pressure can move a corresponding load. In an embodiment, the check valve could be replaced by a pressure compensated flow control for maximum output flow limitation.

The body 198 may include a variable pressure passage 254 fluidly connected in series with the variable flow path 44 with an inlet port 256 fluidly connected to the variable upstream cavity 258. Depending on the spool 200 configuration and position, the variable upstream cavity 258 may fluidly connect to the variable downstream cavity 262 through a variable pressure passage 260. The variable pressure passage 260 may extend to an outlet port 264. If fluid flows through to the outlet port 264, the flow may be free, metered, or blocked as the spool 200 transitions from neutral to another position, depending on the configuration of the spool 200 and spool bore 202.

The spool 200 may be disposed in the spool bore 202 to actuate along the spool bore axis B and control flow through the work section 18. The spool 200 of the first worksection 18 may be configured to selectively connect the parallel flow pressure passage 42 and/or the first variable flow pressure passage 44 to the metered fluid chamber 224. The spool 200 may abut the land 276 while in a neutral position to prevent flow between the parallel pressure cavity 246 and the metered flow chamber 224. The spool 200 may include an undercut 251 extending axially along the spool bore axis B wider than the land 276 to allow fluid flow from the parallel pressure cavity 246 to the metered flow chamber 224 and to the work port 56 when the spool is actuated by the pilot port 210.

The spool may include an undercut 252 extending axially along the spool along the spool bore axis B wider than the land 276 to allow fluid flow from the parallel pressure cavity 246 to the metered flow chamber 224 and to the work port 54 when the spool is actuated by the pilot port 208.

The undercuts 251, 252 are shown fluidly disconnected from one another to prevent fluid from flowing from the parallel pressure cavity 246 when neither undercut 251, 252 extends over the land 276 to the metered flow cavity 272 and the parallel pressure cavity 246.

The spool 200 of the worksection 18 may be configured to meter flow from the parallel flow pressure passage 42 to the metered fluid chamber 224. For example, the spool is movable and as the spool 200 moves along the spool bore axis B in one direction or another to fluidly connect the parallel pressure cavity 246 to the metered fluid chamber 224, fluid flow may increase as the spool 200 continues to move in the same direction. Conversely, fluid flow may decrease as the spool 200 moves in the opposite direction. Once the spool 200 reaches the neutral position flow from the parallel pressure cavity 246 to the metered fluid chamber 224 may stop. Continuing to move the spool 200 in the opposite direction may have the same effect on fluid flow, but the flow is provided to the other workport 54, 56.

The spool 200 of the second worksection 18 [not 20] may be configured to selectively meter flow from the metered fluid cavity 270 to the force sensing cavity 290. The spool 200 includes a slot 255 configured to extend along the spool bore axis B further than a corresponding land 292. In the neutral position, the slot 255 may straddle the land 292 to provide a fluid connection between the force sensing cavity 290 and the metered fluid cavity 272 through the metered fluid cavity 270. When the spool is actuated in one direction or the other, the fluid flow between the slot 255 and the land 292 may decrease, thereby reducing fluid flow to the reservoir 30 through a drain line 279. The decreasing fluid flow allows the fluid pressure in the metered fluid chamber 224 to increase based on the position of the spool to provide individualized load sense to the worksection 18. Fluid flow may stop once the spool is moved further in the same direction. Thus, fluid flow to the reservoir 30 from the metered fluid chamber 224 would cease allowing full pressure from the parallel pressure passage 244 to build up in the metered fluid chamber 224 and/or variable pressure passage 254 to provide to either workport 54, 56.

Force Sensing is a method to may allow a machine operator to recognize and control a higher actuator load. It may be accomplished by creating a variable workport output flow start of meter point. Spool actuation and start to meter position from the neutral spool position may increase with machine actuator load. Increasing spool actuation restricts the Qmet flow to reservoir 30 flow to elevate the worksection Qmet pressure to the point an actuator connected to the operating workport 54, 56 moves against a corresponding load.

Force sensing is optional and can be arranged as the spool 200 transitions from neutral to the first or second position or both positions. The word "Individual" is used because each worksection even if it is not controlling the maximum actuator load can have force sensing.

The spool bore 202 may include the parallel pressure cavity 246 adjacent to the land 276, which is adjacent to the metered flow cavity 272. The metered cavity 286 may be adjacent a land 289 that is adjacent the parallel flow cavity 246 opposite the land 276. A land 288 may be adjacent the metered cavity 286 opposite the land 289 and the workport cavity 285 may be adjacent the land 288 opposite the metered cavity 286. The workport cavity 285 may fluidly connect to the workport 56.

The spool bore 202 may include a land 294 adjacent the metered fluid cavity 272 and the load sense cavity 290 opposite the metered flow cavity 272. The metered flow cavity 270 may be adjacent the load sense cavity 290 and separated by a land 292 and the variable upstream cavity 258 may be adjacent the metered flow cavity 270 separated by a land 274. A land 266 may be adjacent the variable upstream cavity 258 and the variable downstream cavity 262 that is opposite the variable upstream cavity 258. The variable downstream cavity 262 may be adjacent a land 287 that is adjacent the metered cavity 282 opposite the land 287. A land 284 may be adjacent the metered cavity 282 opposite the land 287 and the workport cavity 280 may be adjacent the land 284 opposite the metered cavity 282. The workport cavity 280 may fluidly connect to the workport 54.

The spool bore 202 may be configured to selectively fluidly connect the parallel pressure cavity 246 to the metered cavity 272. For example, when the spool 200 is actuated in one direction or another, the fluid may flow through either undercut 251 or undercut 252 to the metered cavity 272.

The spool 200 of the worksection 18 may be configured to selectively connect the pressure passage 244 to the metered fluid cavity 272. For example, as the spool 200 moves in one direction or another a cross sectional area of fluid flow may open through the undercut 251 or the undercut 252. The cross-sectional area may increase as the spool continues to move in the same direction. A maximum cross-sectional area may be a function of the difference of the axial lengths of the undercut 251 and the land 276. The cross-sectional area may also be a function of the metering notches extending from the various undercuts 251, 252. Also, the maximum cross-sectional area may be a function of the bore depth of the corresponding undercut 251 or undercut 252.

The parallel flow passage 244 may provide flow from the parallel flow pressure passage 42 opening into the parallel flow cavity 246 of the spool bore 202 and having an inlet port 248 opening to the first mounting face 240 and an outlet port 250 opening to the second mounting face 242 in alignment with the inlet port 248 along the stacking axis A such that, when the worksection bodies 98, 198, 298 are stacked together along the stacking axis A. The inlet port 246 may align with the outlet port 150 of the second mounting surface 142. The outlet port 250 of the first flow passage 244 may abut the inlet port 348 of a flow passage 344 in the worksection body stacked against the second mounting face 242. Aligning the inlet port 248 and the outlet port 250 allows each worksection to have a body with the same general shape and size to easily stack in a modular manner. Also, each work section 16, 18, 20 may be selectively re-arranged, removed, or added while retaining functionality of the stack.

In the neutral position, the spool 200 blocks flow from the pressure passage 244 to the metered fluid cavity 270 and provides a first flow area from the metered fluid cavity 270 to the force sensing cavity 290.

In the first displaced position, the spool 200 allows flow from the pressure passage 244 to the metered fluid cavity 270 and provides a second flow area from the metered fluid cavity 270 to the force sensing cavity 290 that is less than the first flow area.

In the second displaced position, further than the first position, the spool 200 allows flow from the pressure passage 244 to the metered fluid cavity 270 and blocks flow from the metered fluid cavity 270 to the force sensing cavity 290.

In the pressure passage 244, is the parallel flow pressure passage 42 fluidly connecting the pressure source 12 to the first, second and third worksections 16, 18, 20 in parallel and opening into the spool bores 102, 202, 302 of the worksections 16, 18, 20. As mentioned above, the parallel flow pressure passage 42 may extend through each worksection 16, 18, 20 to fluidly connect each in parallel.

The upstream variable flow passage 254 may have an inlet port 256 opening to the first mounting face 240 and an outlet opening into a second cavity 258 of the spool bore 202.

In the neutral position, the spool 200 blocks flow from the pressure passage 254 to the metered fluid cavity 270 and provides a first flow area from the metered fluid cavity 270 to the force sensing cavity 290.

In the first displaced position, the spool 200 allows flow from the pressure passage 254 to the metered fluid cavity 270 and provides a second flow area from the metered fluid cavity 270 to the force sensing cavity 290 that is less than the first flow area. The first displaced position may be in either direction along the spool bore axis B.

In the second displaced position, further than the first position, the spool 200 allows flow from the pressure passage 254 to the metered fluid cavity 270 and blocks flow from the metered fluid cavity 270 to the force sensing cavity 290. Blocking fluid flow allows full pressure from the pressure passage 254 to reach the metered fluid chamber 224 to potentially provide the full pressure to either workport 54, 56.

The pressure passage 254 is a variable flow path 44 fluidly connecting the pressure source 12 to the worksections 16, 18, 20 in series. The variable flow path 44 may include the first variable flow pressure passage 254 fluidly connecting the pressure source 12 to the spool bore 202 of the first worksection 18, and a second variable flow pressure passage 354, of the third worksection 20, fluidly connecting the spool bore 202 of the worksection 18 to the spool bore 302 of the worksection 20.

The first variable flow pressure passage 254 may fluidly connect the pressure source 12 to the spool bore 202 of the worksection 18, while the second variable flow pressure passage 260 fluidly connects the spool bore 202 of the worksection 18 to the spool bore 302 of the worksection 20.

The downstream variable flow passage 260, adjacent the second flow passage may have an inlet opening into a variable downstream cavity 262 of the spool bore 202, and an outlet port 264 opening to the second mounting face 242 in alignment with the inlet port 256 of the second flow passage 254 along the stacking axis A. When the worksection bodies 98, 198, 298 are stacked together along the stacking axis A, the outlet port 264 of the downstream variable flow passage 260 may abut the inlet port 356 of the flow passage 354 in worksection body 298 stacked against the second mounting face 242. In other words, the respective variable flow pressure passages 154, 254, 354 may be aligned such that each outlet port 264 is aligned with the inlet port 156, 356 of the next worksection 16, 20 in the stack. Alignment of the inlet and outlet ports may occur in combination with or independent of alignment of the inlet and outlet ports 248, 250.

The variable upstream and downstream cavities 258, 262 may be adjacent and spaced apart by the land 266 along the spool bore axis B. The land 266 allows selectively fluidly connecting the cavities 258, 262 to one another.

The spool bore 202 may be configured to selectively connect the variable upstream cavity to the metered flow cavity 270. The metered flow cavity 270 may be adjacent to and spaced apart from the variable upstream cavity 258 by the land 274 along the spool bore axis B. A bore or metering notch 257 spaced axially from a bore or metering notch 259 may allow the spool 202 to abut the land 274 and to allow fluid flow when the spool 202 is displaced in both directions.

In an embodiment, the spool bore may be configured to selectively fluidly connect the variable upstream cavity to the variable downstream cavity. The corresponding bore may have an axial length greater than the land to allow fluid flow between the two cavities.

In all positions, the spool 200 may block flow from the variable upstream cavity 258 to the variable downstream cavity 162. In the neutral position, the spool 200 may block flow from the variable upstream cavity 258 to the metered flow cavity 270. In the first displaced position, the spool 200 may meter flow from the variable upstream cavity 258 to the metered flow cavity 270. In the second displaced position, the spool 200 may meter flow from the variable upstream cavity 258 to the metered flow cavity 270.

The force sensing cavity 290 may be open to the spool bore 202 and to a drain passage 279 fluidly connecting the force sensing cavity 290 to the reservoir 30.

The load sense passage 278 may open into the metered flow cavity 270. The load sense passage 278 allows a load signal to travel through a shuttle valve 82 and the shuttle valve 80 to provide the pilot port 34 with a maximum load of the stack of worksections 16, 18, 20.

The metered flow cavity 272 is adjacent to and spaced apart from the parallel pressure cavity 246 by a land 276 along the spool bore axis B. In the neutral position, the spool 200 may block flow from the parallel pressure cavity 246 to the metered flow cavity 272. In the first displaced position, the spool 200 may meter flow from the parallel pressure cavity 246 to the metered flow cavity 272. In the second displaced position, the spool 200 may meter flow from the parallel pressure cavity 246 to the metered flow cavity 272.

The first workport 54 may open into the workport cavity 280. The workport cavity allows fluid to flow to the workport 54 and for excess pressure to be relieved through the relief valve 220.

A fluid passage 230 may connect the metered fluid chamber 224 to a metered cavity 282 adjacent to and spaced from the workport cavity 280 by a land 284 along the spool bore axis B.

In the neutral position, the spool 200 may block flow to the workport cavity 280 from the metered cavity 282. In the first position, the spool 200 may allow flow to the workport cavity 280 from the metered cavity 282. In the second position, the spool 200 may block flow to the workport cavity 280 from the metered cavity 282.

In an opposite first position, the spool 200 may block flow to the workport cavity 280 from the metered cavity 282. In an opposite second position, the spool may allow flow to the workport cavity 280 from the metered cavity 282.

The second workport 56 may open into the workport cavity 285. The workport cavity 285 allows fluid to flow to the workport 56 and for excess pressure to be relieved through the relief valve 222.

A fluid passage 232 may connect the metered fluid chamber 224 to a metered cavity 286 adjacent to and spaced from the workport cavity 285 by a land 288 along the spool bore axis B.

In the neutral position, the spool 200 may block flow to the workport cavity 285 from the metered cavity 286. In the first position, the spool 200 may allow flow to the workport cavity 285 from the metered cavity 286. In the second position, the spool 200 may block flow to the workport cavity 285 from the metered cavity 286.

In an opposite first position, the spool 200 may block flow to the workport cavity 285 from the metered cavity 286. In an opposite second position, the spool may allow flow to the workport cavity 285 from the metered cavity 286.

The force sensing cavity 290 may open to the drain passage 279. The drain passage 279 allows the fluid flowing into the force sensing cavity 290 to be drained to the reservoir 30 to remove pressure from the metered fluid chamber 224, thereby potentially allowing individual force sensing for each worksection 16, 18, 20. The force sensing cavity 290 may be adjacent the metered fluid cavity 270 and spaced apart from the metered fluid cavity 270 by a land 292 along the spool bore axis B.

The force sensing cavity 290 may open to a drain passage 279, the force sensing cavity 290 being adjacent the metered fluid cavity 270 on the axial side opposite the first cavity 258 and spaced apart from the metered fluid cavity 270 by a land 292 along the spool bore axis B.

The body 198 may have the opposite first and second mounting faces 240, 242 for mating with mounting faces of adjacent worksection bodies 98, 298 when the worksection 16, 18, 20 bodies are stacked together along a stacking axis A.

The parallel pressure passage 244 may open into a first cavity 246 of the spool bore 202 and having an inlet port 248 opening to the first mounting face 240. The parallel pressure passage 244 may include an outlet port 250 opening to the second mounting face 242 in alignment with the inlet port 248 along the stacking axis A. Aligning the inlet port 248 and the outlet port 250 allows the worksection bodies 98, 198, 298 to be stacked together along the stacking axis A. The outlet port 250 of the first flow passage 244 may abut the inlet port 348 of a flow passage in the next worksection body 298 stacked against the second mounting face 242. As mentioned above, aligning the parallel pressure passages 244 may be independent of or independent of alignment of the variable pressure ports 256, 264.

Such a configuration of the second worksection 18 illustrated in the exemplary embodiment may provide for metered flow from the parallel passage 244 to the metered fluid chamber 224, and may also provide metered flow from the variable upstream cavity 258 to the metered fluid chamber 224. In the illustrated embodiment, the second worksection 18 includes a fixed restriction 236 for restricted flow from the parallel passage 244 to the metered fluid chamber 224. In the illustrated embodiment, the second worksection 18 does not allow variable path flow to pass to variable path downstream cavity 262 to provide full priority over downstream flow. Optionally and advantageously, the second worksection 18 may include force sensing that meters flow from the metered fluid chamber 224 to the tank (T), or reservoir 30, which may be dependent on the position of the spool (e.g., per transitioning to the workports 54 and 56). The metering capability may be provided individually to workport 54, or individually to workport 56, or to both workports 54 and 56, such as per individual worksections, for example.

Third Worksection

Figure 4:
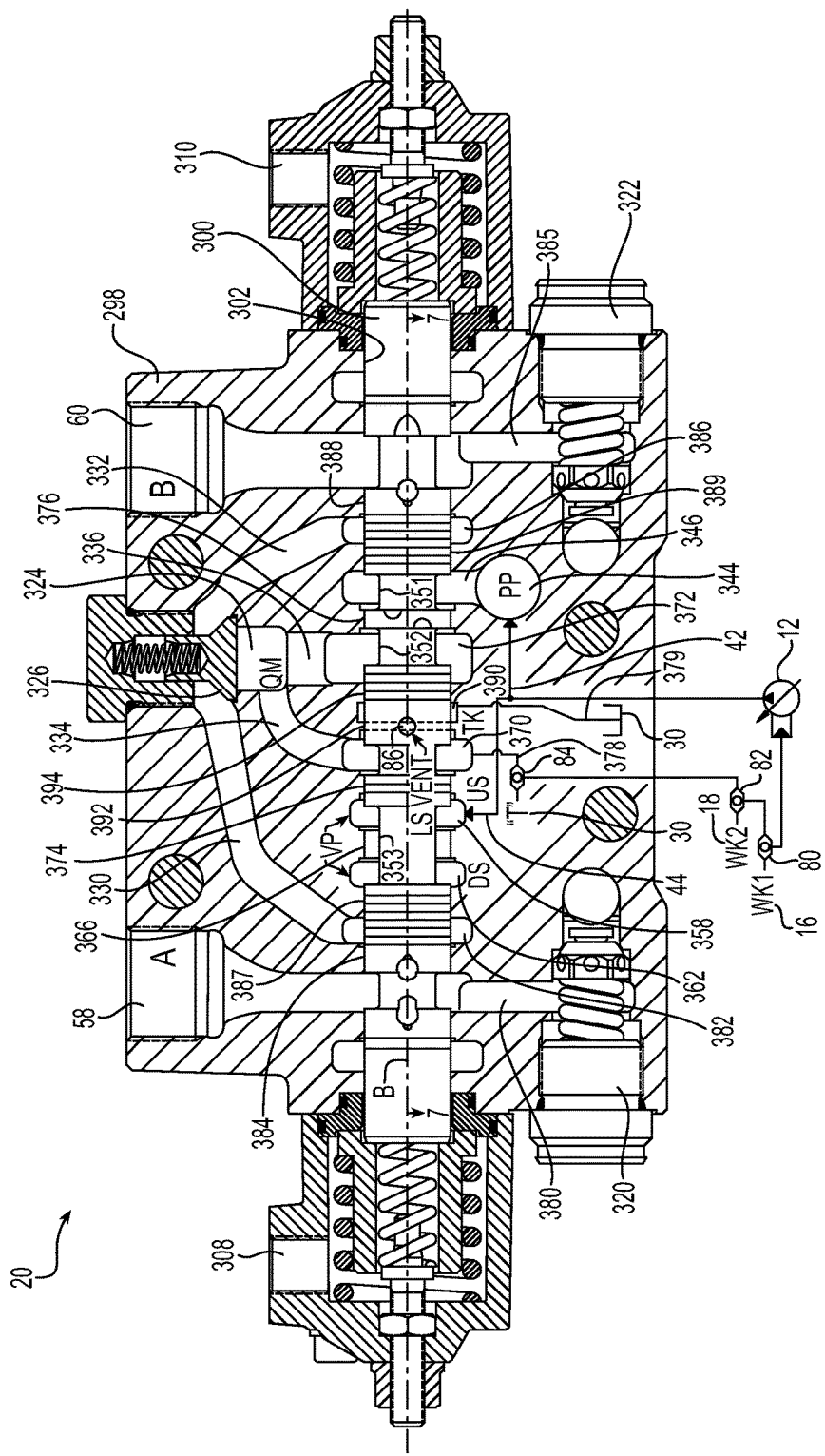
FIG. 4 shows a cross-section of an exemplary third worksection of the control valve of FIG. 1.
Figure 7:
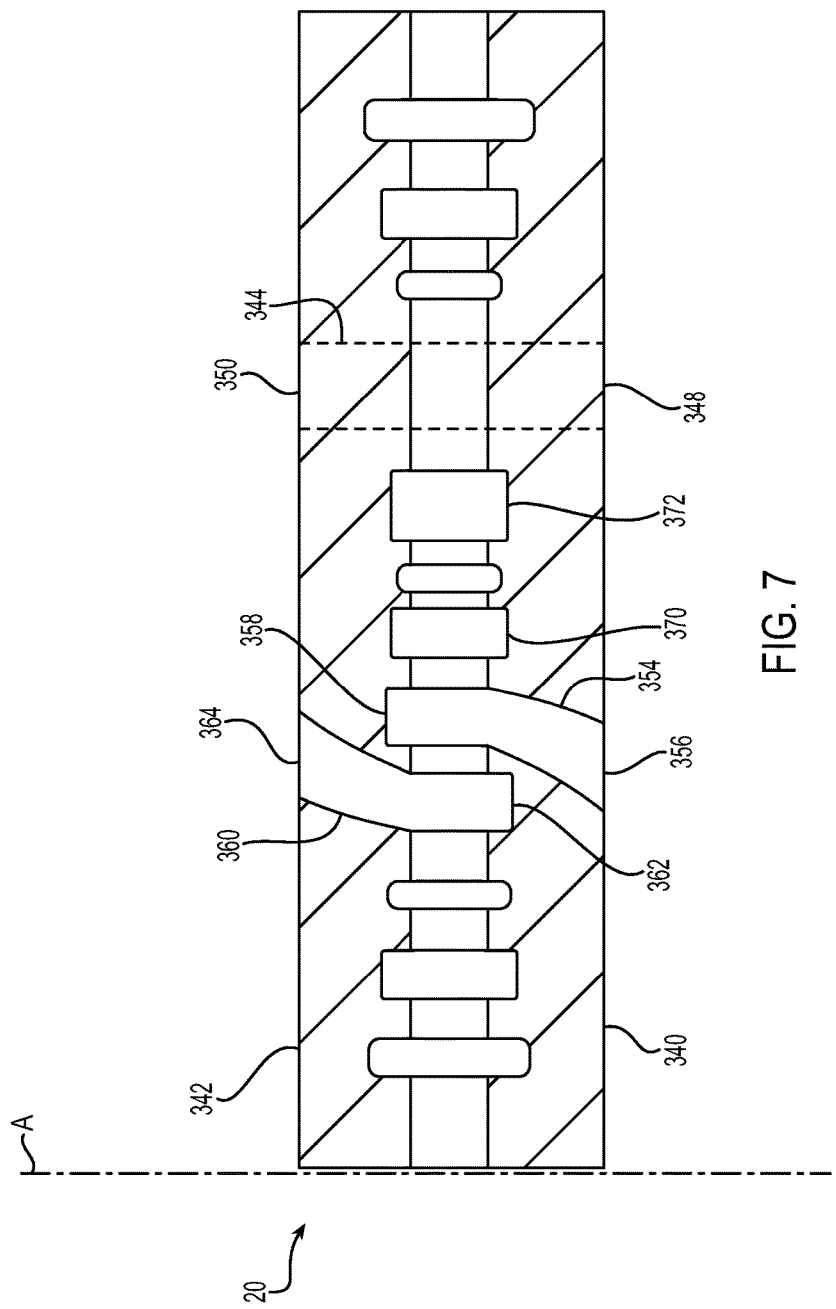
FIG. 7 shows a cross-section of the exemplary third worksection of FIG. 4.

Referring now to FIGS. 1, 4, and 7, the third worksection 20 may include a valve body 298 similar to the valve bodies 98 and 198 (FIGS. 2, 3, 5 and 6), but a different spool 300 is utilized. The worksection 20 may include a first workport 58, a second workport 60, a first pilot port 308, a second pilot port 310, a first relief valve 320, a second relief valve 322. The pilot ports 308, 310 allow hydraulic remote actuation. In an embodiment, manual and/or electrohydraulic solenoid actuation is used.

The body 298 has opposite first and second mounting faces 340, 342 for mating with mounting faces of adjacent worksection bodies when the worksection bodies are stacked together along a stacking axis A. The current example schematically illustrates the second mounting face 342 mating with the outlet section 22.

The spool bore 302 of the body 298 extends along a spool bore axis B transverse to the stacking axis A. Thus, when the worksections 16, 18, 20 are stacked along the stacking axis A movement of the spool 300 along the spool bore does not intersect with any other worksection 16, 18.

The parallel flow pressure passage 42 fluidly may connect the pressure source 12 to the first and second worksections 16, 18 in parallel. For example, parallel flow pressure passage 42 may be a bore extending parallel to the stacking axis A through each worksection 16, 18, 20.

The body 298 may include a metered fluid chamber 324 open to the spool bore of the worksection 20. The metered fluid chamber 324 may receive fluid from the spool bore 302 prior to the fluid flowing to one of the work ports 58, 60. Pump flow may be metered up to this point and may be directed to a workport 58, 60. The metered fluid chamber 324 is downstream of the parallel pressure passage 344 and the variable pressure passage 354. Load sense, LS, pressure may be sensed at the metered fluid chamber 324. Qmet flow is the result of the sum of any flow from the variable flow path 44 and the parallel flow path 42 minus any flow used for force sensing.

The body may include a parallel pressure cavity 346, a variable upstream cavity 358, a variable downstream cavity 362, a metered cavity 370, a metered cavity 372, a workport cavity 380, a metered cavity 382, a workport cavity 385, a metered cavity 386, and a load sensing cavity 390.

The metered fluid chamber 324 may be fluidly connected to metered cavities 370, 372 of the spool bore 302. For example, the cavities 370, 372 extend circumferentially about the spool bore axis B and the body may include a land 394 between the metered passages 370, 372 to abut the spool 300 and prevent mixing of flow between the metered passages 370, 372 except for in the metered flow chamber 324. Also, the body 298 may include a metered passage 334 to fluidly connect the metered cavity 370 to the metered flow chamber 324 independently of the metered cavity 372.

The body 298 may include a fluid passage 336 disposed between the metered fluid chamber 324 and the metered cavity 372 to allow fluid flow from the parallel pressure passage 344 to the work ports 58, 60. In an embodiment, the fluid passage is a fluid restriction for restricting flow from the first flow passage to the workports.

A check valve 326 may be disposed between the metered fluid chamber 324 and one of or both workports 58, 60 such that flow from a workport 58, 60 to the metered fluid chamber is prevented. The check valve 326 may be a load check valve with a minimum pressure setting based on a required fluid pressure of one or both of the workports 58, 60. The check valve 326 is downstream of the metered fluid chamber 324. The check valve 326 may prevent reverse flow from an actuator attached to one of the workports 58, 60 toward the pressure source 12 in case of pump failure or supply line rupture. Also a closed check may be used to support an actuator load as the spool 300 is actuated until increasing inlet pressure can move a corresponding load. In an embodiment, the check valve could be replaced by a pressure compensated flow control for maximum output flow limitation.

The body 298 may include a variable pressure passage 354 fluidly connected in series with the variable flow path 44 with an inlet port 356 fluidly connected to the variable upstream cavity 358. Depending on the spool 300 configuration and position, the variable upstream cavity 358 may fluidly connect to the variable downstream cavity 362 through a variable pressure passage 360. The spool 300 illustrated may allow fluid flow from the variable upstream cavity 358 to the variable downstream cavity 362 in any position of the spool 300. The variable pressure passage 360 may extend to an outlet port 364. If fluid flows through to the outlet port 364, the flow may be free, metered, or blocked as the spool 300 transitions from neutral to another position, depending on the configuration of the spool 300 and spool bore 302.

The spool 300 may be disposed in the spool bore 302 to actuate along the spool bore axis B and control flow through the work section 20. The spool 300 of the worksection 20 may be configured to selectively connect the parallel flow pressure passage 42 to the metered fluid chamber 324. The spool 300 may abut the land 376 while in a neutral position to prevent flow between the parallel pressure cavity 346 and the metered flow chamber 324. The spool 300 may include an undercut 351 extending axially along the spool bore axis B wider than the land 376 to allow fluid flow from the parallel pressure cavity 346 to the metered flow chamber 324 and to the work port 60 when the spool is actuated by the pilot port 310.

The spool may include an undercut 352 extending axially along the spool along the spool bore axis B wider than the land 376 to allow fluid flow from the parallel pressure cavity 346 to the metered flow chamber 324 and to the work port 58 when the spool is actuated by the pilot port 308.

The undercuts 351, 252 are shown fluidly disconnected from one another to prevent fluid from flowing from the parallel pressure cavity 346 when neither undercut 351, 352 extends over the land 376 to the metered flow cavity 372 and the parallel pressure cavity 346.

The spool 300 of the worksection 20 may be configured to meter flow from the parallel flow pressure passage 42 to the metered fluid chamber 324. For example, the spool is movable and as the spool 300 moves along the spool bore axis B in one direction or another to fluidly connect the parallel pressure cavity 346 to the metered fluid chamber 324, fluid flow may increase as the spool 300 continues to move in the same direction. Conversely, fluid flow may decrease as the spool 300 moves in the opposite direction. Once the spool 300 reaches the neutral position flow from the parallel pressure cavity 346 to the metered fluid chamber 324 may stop. Continuing to move the spool 300 in the opposite direction may have the same effect on fluid flow, but the flow is provided to the other workport 58, 60.

The spool 300 of the worksection 20 may be configured so that the connection of the metered fluid cavity 370 to the force sensing cavity 390 closes before metered flow from the parallel pressure passage 344 and/or variable pressure passage 354 starts.

The spool may include load sense vent 86 to decay metered fluid cavity 370 residual pressure by allowing fluid flow to the reservoir 30 through the drain port 379 in the neutral position and prior to the start of metered position of an actuator load.

Force sensing is optional and can be arranged as the spool 300 transitions from neutral to the first or section position or both positions. The word "Individual" is used because each worksection even if it is not controlling the maximum actuator load can have force sensing.

The spool bore 302 may include the parallel pressure cavity 346 adjacent to the land 376, which is adjacent to the metered flow cavity 372. The metered cavity 386 may be adjacent a land 389 that is adjacent the parallel flow cavity 346 opposite the land 376. A land 388 may be adjacent the metered cavity 386 opposite the land 389 and the workport cavity 385 may be adjacent the land 388 opposite the metered cavity 386. The workport cavity 385 may fluidly connect to the workport 60.

The spool bore 302 may include a land 394 adjacent the metered fluid cavity 372 and the load sense cavity 390 opposite the metered flow cavity 372. The metered flow cavity 370 may be adjacent the load sense cavity 390 and separated by a land 392 and the variable upstream cavity 358 may be adjacent the metered flow cavity 370 separated by a land 374. A land 366 may be adjacent the variable upstream cavity 358 and the variable downstream cavity 362 that is opposite the variable upstream cavity 358. The variable downstream cavity 362 may be adjacent a land 387 that is adjacent the metered cavity 382 opposite the land 387. A land 384 may be adjacent the metered cavity 382 opposite the land 387 and the workport cavity 380 may be adjacent the land 384 opposite the metered cavity 382. The workport cavity 380 may fluidly connect to the workport 58.

The spool bore 302 may be configured to selectively fluidly connect the parallel pressure cavity 346 to the metered cavity 372. For example, when the spool 300 is actuated in one direction or another, the fluid may flow through either undercut 351 or undercut 352 to the metered cavity 372.

The spool 300 of the worksection 20 may be configured to freely allow flow from the upstream variable flow pressure passage 354 to the downstream variable flow pressure passage 360 in every position of the spool 300. For example, as the spool 300 moves in one direction or another a cross sectional area of fluid flow may remain open through the bore 353. The cross-sectional area may decrease or remain constant as the spool 300 continues to move in the same direction. A maximum cross-sectional area may be a function of the axial length of the bore 353. Also, the maximum cross-sectional area may be a function of the bore depth of the bore 353. During operation of the present stack of worksections 16, 18, 20, variable flow path 44 pressure may never reach the worksection 20, but another configuration of worksections 16, 18, 20 could be utilized to provide variable flow path 44 pressure to any desired worksection of a given stack.

The parallel flow passage 344 may provide flow from the parallel flow pressure passage 42 opening into the parallel flow cavity 346 of the spool bore 302 and having an inlet port 348 opening to the first mounting face 340 and an outlet port 350 opening to the second mounting face 342 in alignment with the inlet port 348 along the stacking axis A such that, when the worksection bodies 98, 198, 298 are stacked together along the stacking axis A, an outlet port 350 of the first flow passage 344 abuts the outlet section 22. Aligning the inlet port 348 and the outlet port 350 allows each worksection to have a body with the same general shape and size to easily stack in a modular manner. Also, each work section 16, 18, 20 may be selectively re-arranged, removed, or added while retaining functionality of the stack.

In the neutral position, the spool 300 blocks flow from the pressure passage 344 to the metered fluid cavity 370 and provides the vent 86 with a flow area from the metered fluid cavity 370 to the force sensing cavity 390.

In the first displaced position, the spool 300 allows flow from the pressure passage 344 to the metered fluid cavity 370 and provides the vent 86 with no flow area from the metered fluid cavity 370 to the force sensing cavity 390.

In the second displaced position, further than the first position, the spool 300 allows flow from the pressure passage 344 to the metered fluid cavity 370 and provides the vent 86 with no flow area from the metered fluid cavity 370 to the force sensing cavity 390.

In the pressure passage 344, is the parallel flow pressure passage 42 fluidly connecting the pressure source 12 to the worksections 16, 18, 20 in parallel and opening into the spool bores 102, 202, 302 of the worksections 16, 18, 20. As mentioned above, the parallel flow pressure passage 42 may extend through each worksection 16, 18, 20 to fluidly connect each in parallel.

The upstream variable flow passage 354 may have an inlet port 356 opening to the first mounting face 340 and an outlet opening into a second cavity 358 of the spool bore 302.

In the neutral position, the spool 300 blocks flow from the pressure passage 354 to the metered fluid cavity 370 and provides the vent 86 with a flow area from the metered fluid cavity 370 to the force sensing cavity 390.

In the first displaced position, the spool 300 blocks flow from the pressure passage 354 to the metered fluid cavity 370 and provides the vent 86 with no flow area from the metered fluid cavity 370 to the force sensing cavity 390. The first displaced position may be in either direction along the spool bore axis B.

In the second displaced position, further than the first position, the spool 300 blocks flow from the pressure passage 354 to the metered fluid cavity 370 and provides the vent 86 with no flow area from the metered fluid cavity 370 to the force sensing cavity 390.

The pressure passage 354 is a variable flow path 44 fluidly connecting the pressure source 12 to the worksections 16, 18, 20 in series. The variable flow path 44 may include the first variable flow pressure passage 354 fluidly connecting the pressure source 12 to the spool bore 302 of the worksection 20, and a another variable flow pressure passage fluidly connecting the spool bore 302 to the outlet section 22, or another worksection.

The second variable flow pressure passage 360 may fluidly connect the spool bore 302 of the worksection 20 to the outlet section 22.

The downstream variable flow passage 360, adjacent the second flow passage 354 may have an inlet opening into a variable downstream cavity 362 of the spool bore 302, and an outlet port 364 opening to the second mounting face 342 in alignment with the inlet port 356 of the second flow passage 354 along the stacking axis A. When the worksection bodies 98, 198, 298 are stacked together along the stacking axis A, the outlet port 364 of the downstream variable flow passage 360 may abut an inlet port of the outlet section stacked against the second mounting face 342. The respective variable flow pressure passages 154, 254, 354 may be aligned such that each outlet port 164, 364 is aligned with the inlet port 256, 356 of the previous worksection 16, 18 in the stack. Alignment of the inlet and outlet ports may occur in combination with or independent of alignment of the inlet and outlet ports 348, 350.

The variable upstream and downstream cavities 358, 362 may be adjacent and spaced apart by the land 366 along the spool bore axis B. The land allows selectively fluidly connecting the cavities 358, 362 to one another. For example, the spool bore 302 may be configured to selectively fluidly connect the variable upstream cavity 358 to the variable downstream cavity 362. The corresponding bore 353 may have an axial length greater than the land 366 to allow fluid flow between the two cavities 358, 362.

In the neutral position, the spool 300 allows flow from the variable upstream cavity 358 to the variable downstream cavity 362. In the first displaced position, the spool 300 may allow free flow from the variable upstream cavity 358 to the variable downstream cavity 362. In the second position, the bore 353 may allow flow from the variable upstream cavity 358 to the variable downstream cavity 362 at the same rate as in the neutral position. In the second displaced position, the spool 300 may allow free flow from the variable upstream cavity 358 to the variable downstream cavity 362.

In the third displaced position, the spool 300 may allow free flow from the variable upstream cavity 358 to the variable downstream cavity 362.

In the fourth displaced position, the spool 300 may allow free flow from the variable upstream cavity 358 to the variable downstream cavity 362.

The force sensing cavity 390 may be open to the spool bore 302 and to a drain passage 379 fluidly connecting the force sensing cavity 390 to the reservoir 30.

The metered flow cavity 370 may be adjacent to and spaced apart from the variable upstream cavity 358 by the land 374 along the spool bore axis B.

In the first displaced position, the spool 300 may block flow from the variable upstream cavity 358 to the metered flow cavity 170.

In the second displaced position, the spool 300 may block flow from the second cavity 358 to the metered flow cavity 370.

The load sense passage 378 may open into the metered flow cavity 370. The load sense passage 378 allows a load signal to travel through a shuttle valve 84 and the shuttle valves 80, 82 to provide the pilot port 34 with a maximum load of the stack of worksections 16, 18, 20.

The metered flow cavity 372 is adjacent to and spaced apart from the parallel pressure cavity 346 by a land 376 along the spool bore axis B. In the neutral position, the spool 300 may block flow from the parallel pressure cavity 346 to the metered flow cavity 372. In the first displaced position, the spool 300 may meter flow from the parallel pressure cavity 346 to the metered flow cavity 372. In the second displaced position, the spool 300 may meter flow from the parallel pressure cavity 346 to the metered flow cavity 372.

The first workport 58 may open into the workport cavity 380. The workport cavity allows fluid to flow to the workport 58 and for excess pressure to be relieved through the relief valve 320.

A fluid passage 330 may connect the metered fluid chamber 324 to a metered cavity 382 adjacent to and spaced from the workport cavity 380 by a land 384 along the spool bore axis B.

In the neutral position, the spool 300 may block flow to the workport cavity 380 from the metered cavity 382. In the first position, the spool 300 may allow flow to the workport cavity 380 from the metered cavity 382. In the second position, the spool 300 may block flow to the workport cavity 380 from the metered cavity 382.

In an opposite first position, the spool 300 may block flow to the workport cavity 380 from the metered cavity 382. In an opposite second position, the spool may allow flow to the workport cavity 380 from the metered cavity 382.

The second workport 60 may open into the workport cavity 385. The workport cavity 385 allows fluid to flow to the workport 60 and for excess pressure to be relieved through the relief valve 322.

A fluid passage 332 may connect the metered fluid chamber 324 to a metered cavity 386 adjacent to and spaced from the workport cavity 385 by a land 388 along the spool bore axis B.

In the neutral position, the spool 300 may block flow to the workport cavity 385 from the metered cavity 386. In the first position, the spool 300 may allow flow to the workport cavity 385 from the metered cavity 386. In the second position, the spool 300 may block flow to the workport cavity 385 from the metered cavity 386.

In an opposite first position, the spool 300 may block flow to the workport cavity 385 from the metered cavity 386. In an opposite second position, the spool may allow flow to the workport cavity 385 from the metered cavity 386.

The force sensing cavity 390 may open to the drain passage 379. The drain passage 379 allows the fluid flowing into the force sensing cavity 390 to be drained to the reservoir 30 to remove pressure from the metered fluid chamber 324, thereby potentially allowing individual force sensing for each worksection 16, 18, 20. The force sensing cavity 390 may be adjacent the metered fluid cavity 370 and spaced apart from the metered fluid cavity 370 by a land 392 along the spool bore axis B.

The force sensing cavity 390 may open to a drain passage 379, the force sensing cavity 390 being adjacent the metered fluid cavity 370 on the axial side opposite the first cavity 358 and spaced apart from the metered fluid cavity 370 by a land 392 along the spool bore axis B.

The body 298 may have the opposite first and second mounting faces 340, 342 for mating with mounting faces of adjacent worksection bodies 198 when the worksection 16, 18, 20 bodies are stacked together along a stacking axis A.

The parallel pressure passage 344 may open into a first cavity 346 of the spool bore 302 and having an inlet port 348 opening to the first mounting face 340. The parallel pressure passage 344 may include an outlet port 350 opening to the second mounting face 342 in alignment with the inlet port 348 along the stacking axis A. Aligning the inlet port 348 and the outlet port 350 allows the worksection bodies 198, 298 to be stacked together along the stacking axis A. The outlet port 350 of the first flow passage 344 may abut an inlet port of a flow passage in the outlet section 22 or the next worksection body stacked against the second mounting face 342. As mentioned above, aligning the parallel pressure passages 344 may be independent of or independent of alignment of the variable pressure ports 356, 364.

Such a configuration of the third worksection 20 illustrated in the exemplary embodiment may provide for metered flow from the parallel passage 344 to the metered fluid chamber 324, but may not provide metered flow from the variable upstream cavity 358 to the metered fluid chamber 324. In the illustrated embodiment, the third worksection 20 does not include a fixed restriction. In the illustrated embodiment, the third worksection 20 has a spool load sense vent 86 to provide flow from the metered fluid cavity 370 to the force sensing cavity 390. The third worksection 20 may also enable free flow of the fluid to variable downstream cavity 362 to promote flow sharing.

Additional Embodiments

Figure 8:
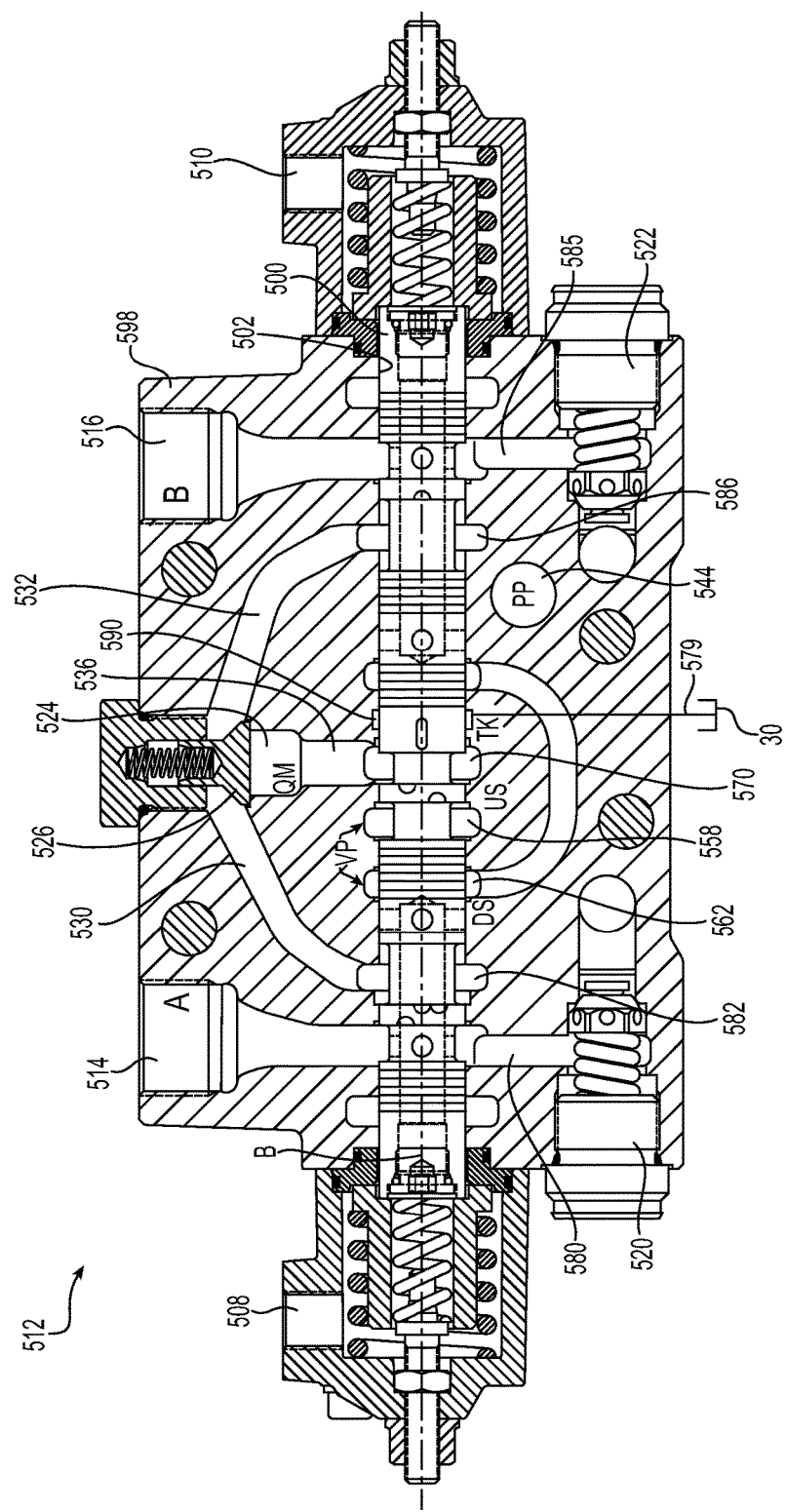
FIG. 8 shows a cross-section of another exemplary worksection.

Referring now to FIG. 8, another exemplary (fourth) worksection 512 is shown. The fourth worksection 512 is substantially the same as or similar to the above-referenced worksection 16, and consequently the same or similar reference numerals, but with a prefix "5", are used to denote structures corresponding to the same or similar structures in the worksection.

The fourth ("series") worksection 512 may include a body 598, a spool 500 disposed in a spool bore 502 of the body 598, a first workport 514, a second workport 516, a first pilot port 508, a second pilot port 510, a first relief valve 520, a second relief valve 522. The pilot ports 508, 510 allow hydraulic remote actuation. In other embodiments, manual and/or electrohydraulic solenoid actuation may be used.

The body 598 has opposite first and second mounting faces for mating with mounting faces of adjacent worksection bodies when the worksection bodies are stacked together along a stacking axis. The spool bore 502 of the body 598 extends along a spool bore axis B transverse to the stacking axis. The spool 500 may be configured to meter pump supply flow to either workport 514 and 516, or both workports 514, 516.

The body 598 may include a metered fluid chamber 524 open to the spool bore 502 of the fourth worksection 512. The metered fluid chamber 524 may receive fluid from the spool bore 502 prior to the fluid flowing to one of the work ports 514, 516. The body may include a parallel pressure flow passage 544, a variable upstream cavity 558, and a variable downstream cavity 562, which may function in a similar manner as in the worksections 16, 18, 20 described above.

In the illustrated embodiment, the metered fluid chamber 524 providing flow to the workports 514, 516 is metered from the variable upstream cavity 558, and the workport 514 or 516 input flow connects to the variable downstream cavity 562. In the illustrated embodiment, the parallel pressure flow passage 544 does not feed the metered fluid chamber 524, but the parallel pressure passage 544 may supply flow downstream.

Figure 9:
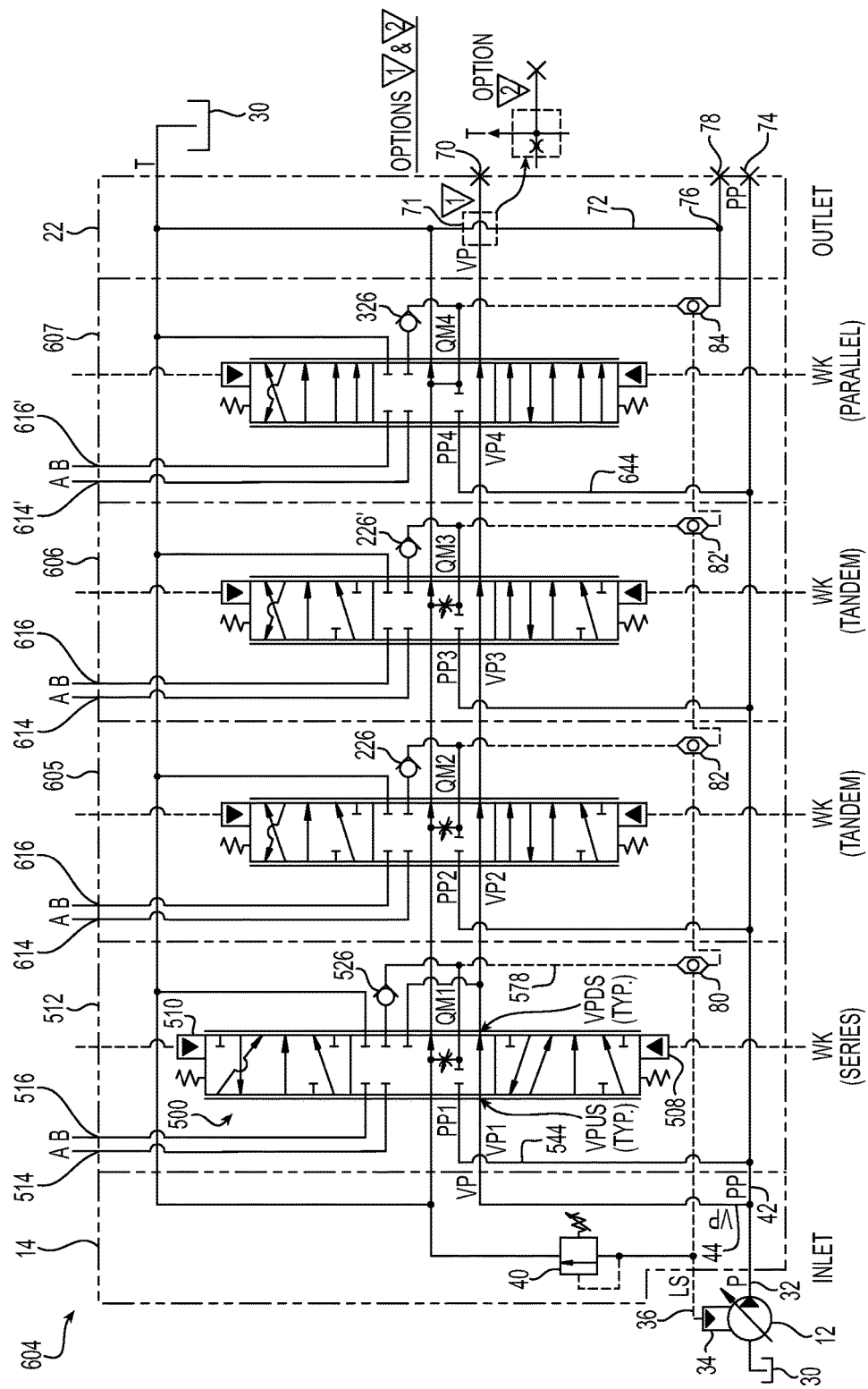
FIG. 9 shows a schematic diagram of an exemplary hydraulic system including an exemplary control valve that includes the exemplary worksection of FIG. 8.

Referring now to FIG. 9, an exemplary hydraulic system 604 that includes the fourth ("series") worksection 512 is shown. The hydraulic system 604 is similar to the above-referenced hydraulic system 10, and consequently the same or similar reference numerals are used to denote structures corresponding to the same or similar structures in the hydraulic system.

In the illustrated embodiment, the hydraulic system includes the fourth ("series") worksection 512, a tandem worksection 605, another tandem worksection 606, and a parallel worksection 607.

The fourth ("series") worksection 512 is described above. The "tandem" worksections 605 and 606 are the same. The worksections 605 and 606 are similar to the above-referenced first worksection 16 due to the same variable path downstream flow metering and blockage, force sensing, and fluid passage 536. However, the tandem worksections 605 and 606 do not demand parallel path flow like the first worksection 16. The "parallel worksection" 607 is substantially the same as the third worksection 20 described above, and consequently similar reference numerals are used to refer to the same or similar structures.

An inlet section 14 receives fluid from a pressure source 12 through an inlet passage 32. The fluid is split within the inlet section 14 into a parallel flow pressure passage 42 and a variable flow path 44. In the illustrated embodiment, the parallel flow pressure passage 42 connects in parallel to each worksection 512, 605, 606, and 607, however, the worksections 512, 605 and 606 do not demand parallel pressure passage 42 flow. For the worksection 512, the parallel pressure passage 42 flow passes through the worksection 512 and the parallel pressure passage 42 does not connect to the spool bore 502 (as shown in FIG. 8). For the worksections 605 and 606, the parallel pressure passage 42 connects with the spool bore in each worksection 605 and 606.

In the illustrated embodiment, the fourth ("series") worksection 512 enables the variable path upstream cavity 558 to feed the metered fluid chamber 524 providing flow to workport 514 or workport 516, and the workport 514 or 516 input flow connects to the variable downstream cavity 562. The tandem worksections 605 and 606 may each enable a variable path upstream cavity to feed a metered fluid chamber providing flow to workport 614 or workport 616, and the workport 614 or 616 input flow may connect to a tank return, T. The parallel worksection 607 enables a parallel pressure passage 644 to feed a metered fluid chamber providing flow to workport 614' or workport 616', and the workport 614' or 616' input flow may connect to a tank return, T. In this manner, the fourth ("series") worksection 512 may be actuated simultaneously with at least one of the tandem worksections 605, 606 such as each worksection controls a hydraulic motor.

In the illustrated embodiment, the parallel flow path 42 is shown blocked at point 74 but it can be open so that parallel flow path 42 flow can be connected. Or, as expressed in the art, parallel flow path 42 flow could have a "power beyond" connection to another valve assembly of this new type or another valve. In addition, the variable flow path 44 is shown blocked at point 70 but it can be open so that variable flow path 44 flow could be connected. Or, as commonly expressed, the variable flow path 44 flow could have a "power beyond" connection to another valve assembly of this new type or another valve.

Also shown in FIG. 9, the exemplary hydraulic system 604 may optionally have the variable flow path 44 connected internally to tank return, T, as shown at point 71 ("option 2"), for providing an open center valve configuration. In addition, the "option 2" configuration provides a restriction in the variable flow path 44, which may be varied from more restrictive to less restrictive or unrestrictive, depending on the application.

Figure 10:
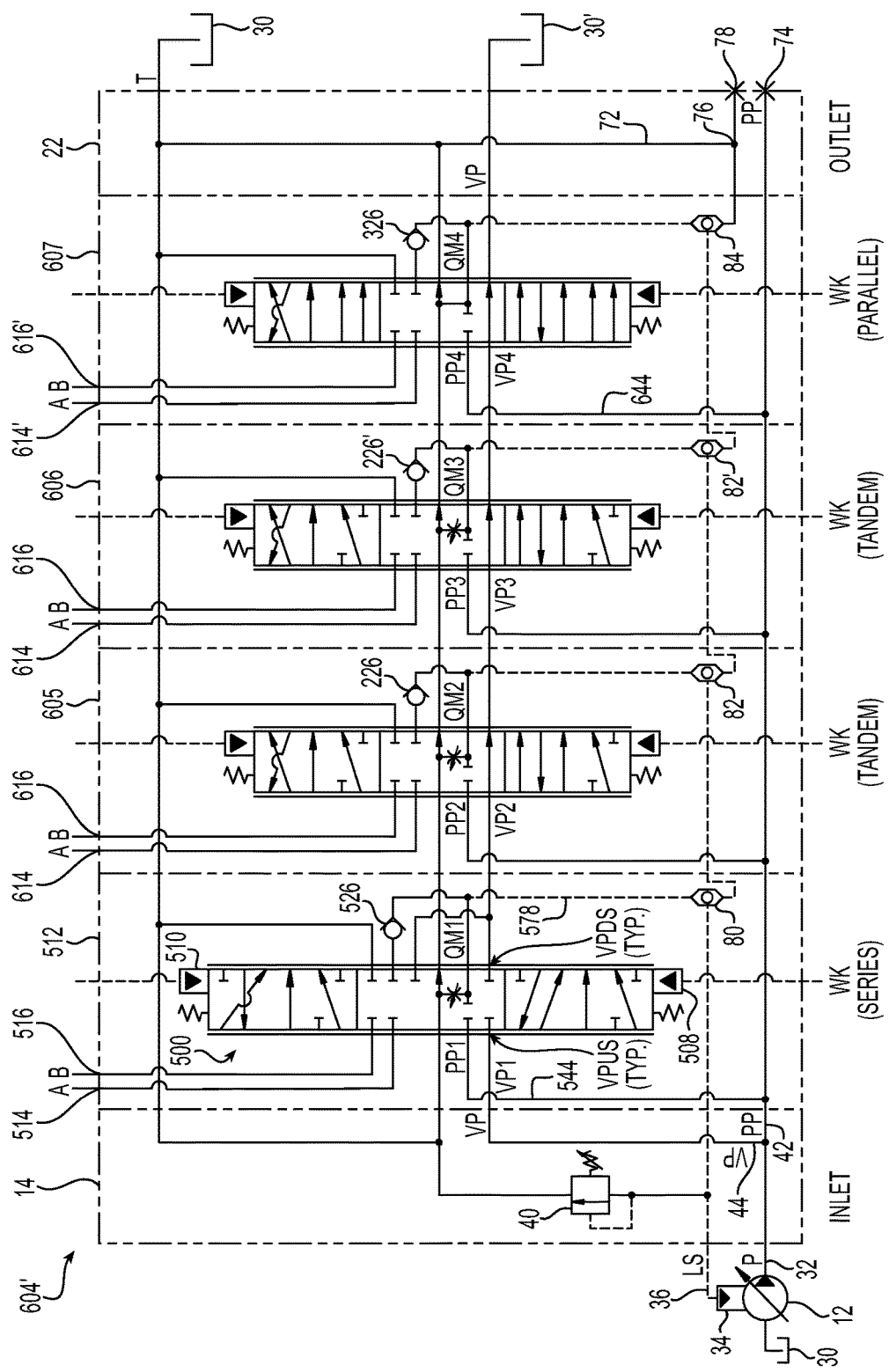
FIG. 10 shows another schematic diagram of an exemplary hydraulic system including an exemplary control valve that includes the exemplary worksection of FIG. 8.

Referring now to FIG. 10, another exemplary hydraulic system 604' is shown. The hydraulic system 604' is the same as or substantially similar to the above-referenced hydraulic system 604, except that variable flow path 44 is shown connected to a reservoir 30' to convert the valve assembly to an open center type. In this manner, the fourth ("series") worksection 512 may be operated independently, or simultaneously with at least one of the tandem worksections 605, 606.

Figure 11:
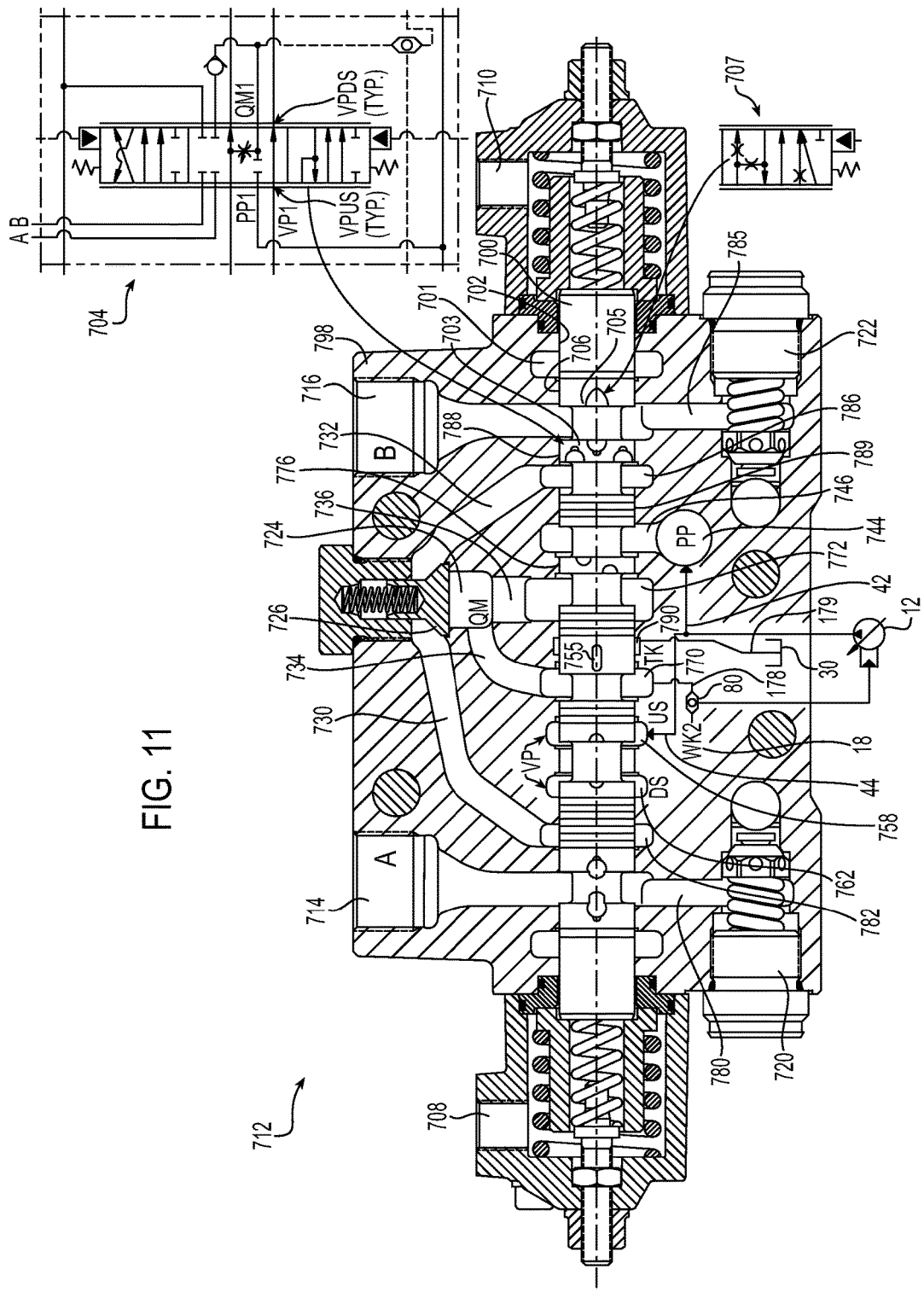
FIG. 11 shows a cross-section of another exemplary worksection.

Referring now to FIG. 11, another exemplary (fifth) worksection 712 is shown. The fifth worksection 712 is substantially the same as or similar to the above-referenced worksection 16, and consequently the same or similar reference numerals, but with a prefix "7", are used to denote structures corresponding to the same or similar structures in the worksection.

The fifth ("three-position regenerative") worksection 712 may include a body 798, a spool 700 disposed in a spool bore 702 of the body 798, a first workport 714, a second workport 716, a first pilot port 708, a second pilot port 710, a first relief valve 720, a second relief valve 722. The pilot ports 708, 710 allow hydraulic remote actuation. In other embodiments, manual and/or electrohydraulic solenoid actuation may be used.

The body 798 has opposite first and second mounting faces for mating with mounting faces of adjacent worksection bodies when the worksection bodies are stacked together along a stacking axis. The spool bore 702 of the body 798 extends along a spool bore axis B transverse to the stacking axis. The spool 700 may be configured to meter pump supply flow to either workport 714 and 716 or both workports 714, 716.

The body 798 may include a metered fluid chamber 724 open to the spool bore 702 of the fifth worksection 712. The metered fluid chamber 724 may receive fluid from the spool bore 702 prior to the fluid flowing to one of the work ports 714, 716. The body may include a parallel pressure flow passage 744, a variable upstream cavity 758, and a variable downstream cavity 762, which may function the similar to the worksection 16 described above.

The spool bore 702 may include a parallel pressure cavity 746 adjacent to a land 776, which is adjacent to a metered flow cavity 772. A metered cavity 786 may be adjacent a land 789 that is adjacent the parallel flow cavity 746 opposite the land 776. A land 788 may be adjacent the metered cavity 786 opposite the land 789 and the workport cavity 785 may be adjacent the land 788 opposite the metered cavity 786. The workport cavity 785 may fluidly connect to the workport 716.

In the illustrated embodiment, the spool 700 has a spool land 703 having metering notches. The spool land 703 may be configured to cooperate with the body land 788 to enable input flow from the workport 716 to be regenerated to workport 714. A schematic diagram of a portion of the worksection 712 illustrating this function is shown at 704. The spool 700 may also have a spool land 705 configured to cooperate with a body land 706 that enables input flow from the workport 716 to tank via passage 701. A schematic diagram of a portion of the worksection 712 illustrating this function is shown at 707. In this manner, input flow from the workport 716 may be split between regenerative flow from workport 716 to workport 714, and from workport 716 to tank.

Figure 12:
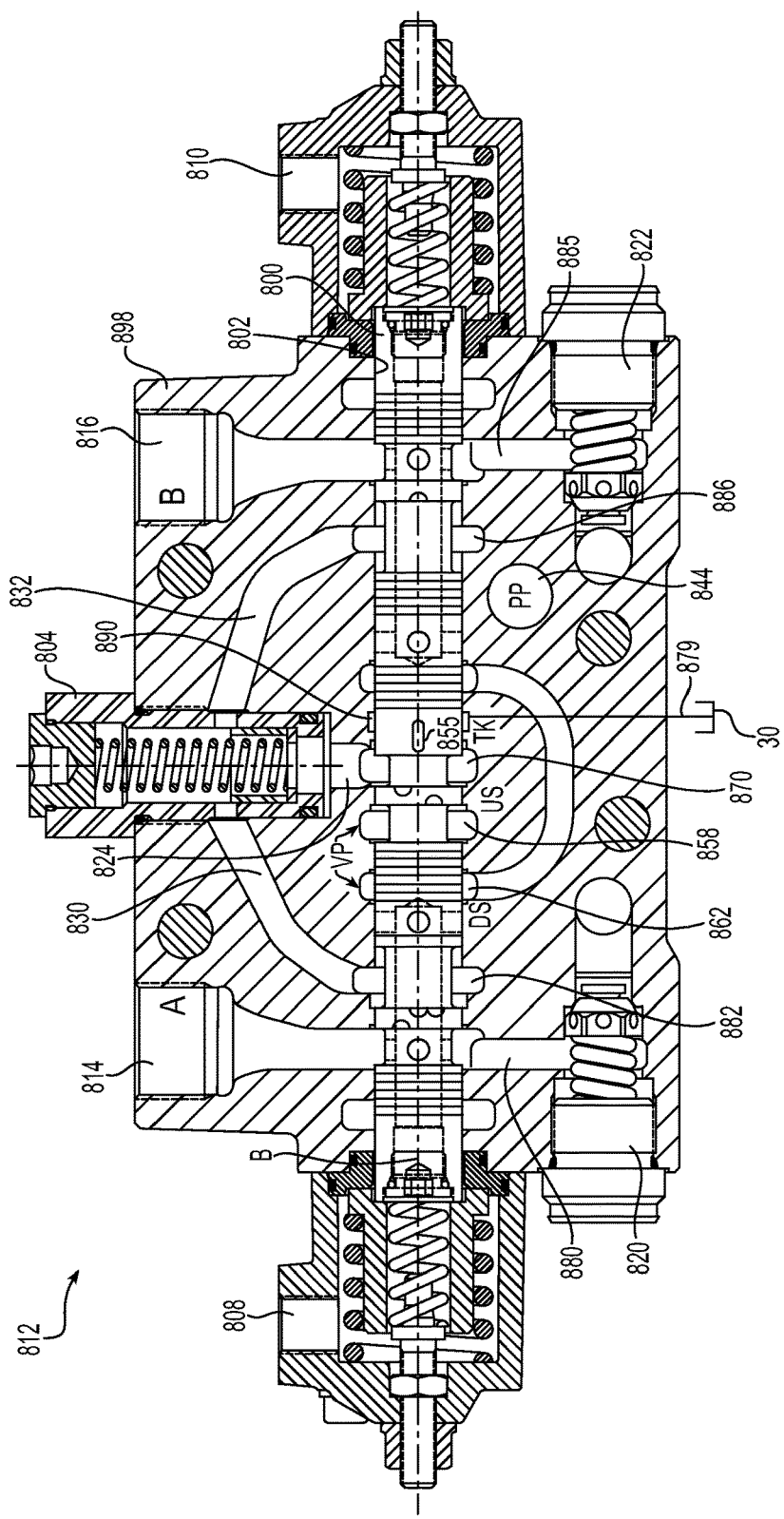
FIG. 12 shows a cross-section of yet another exemplary worksection.

Referring now to FIG. 12, another exemplary (sixth) worksection 812 is shown. The sixth worksection 812 is substantially the same as or similar to the above-referenced fourth worksection 512, and consequently the same or similar reference numerals, but with a prefix "8" instead of the prefix "5", are used to denote structures corresponding to the same or similar structures in the worksection. In the illustrated embodiment, a pressure compensated flow control valve 804 replaces the check valve 526 (shown in FIG. 8) for limiting maximum output flow from the metered fluid chamber 824 to the workports 814 and 816.

Figure 13:
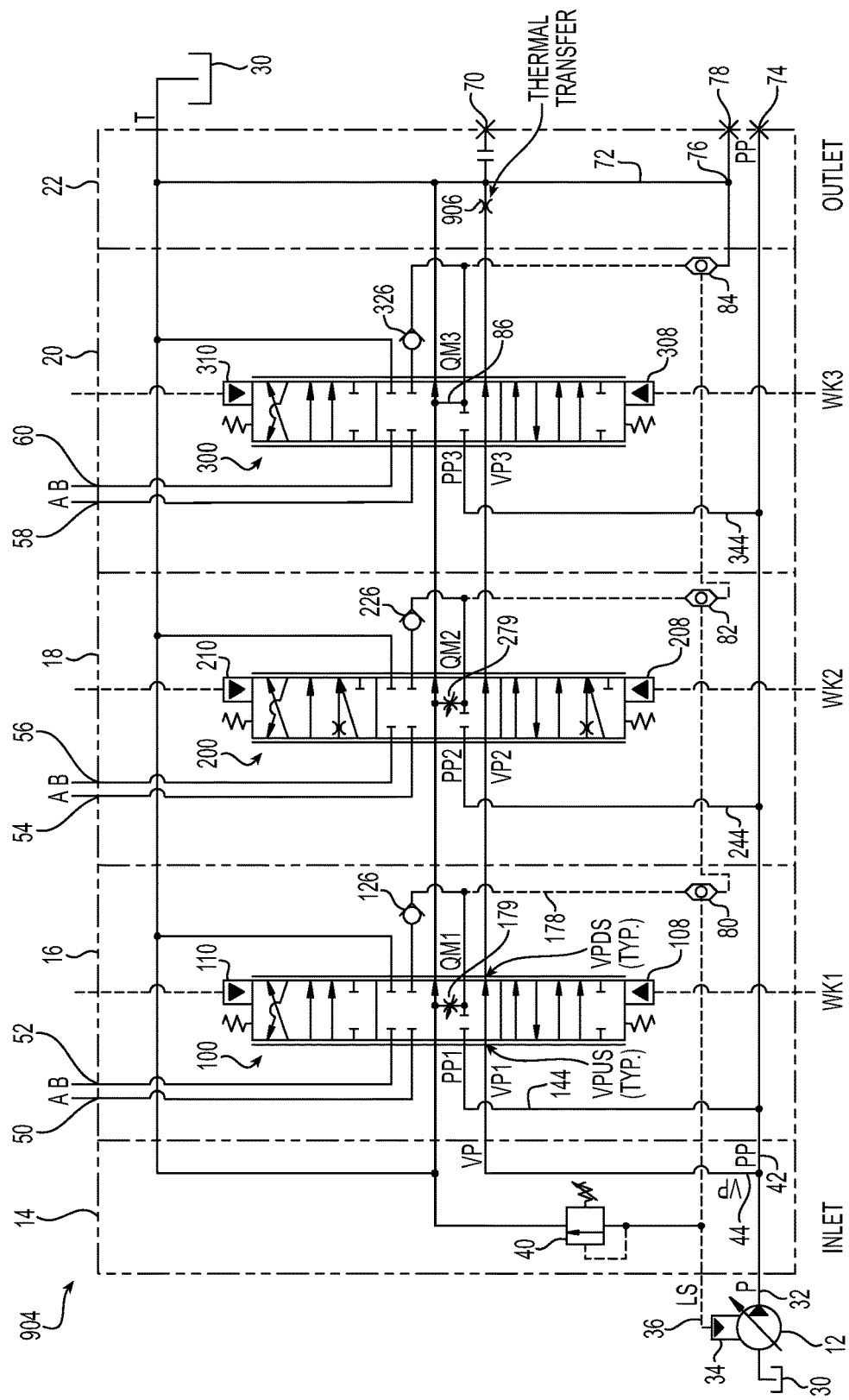
FIG. 13 shows a schematic diagram of an exemplary hydraulic system including the control valve of FIG. 1 further including thermal transfer.

Referring now to FIG. 13, another exemplary hydraulic system 904 is shown. The hydraulic system 904 is substantially the same as or similar to the above-referenced hydraulic system 10, and consequently the same reference numerals are used to denote structures corresponding to the same or similar structures in the hydraulic system. In the illustrated embodiment, the variable flow path 44 is shown including thermal transfer at point 906. The hydraulic system 904 may eliminate typical pump minimum volume stop and flushing valve. The pump margin pressure setting and orifice size may be configured to determine standby flow to continually circulate fluid to the cooler.

Figure 14:
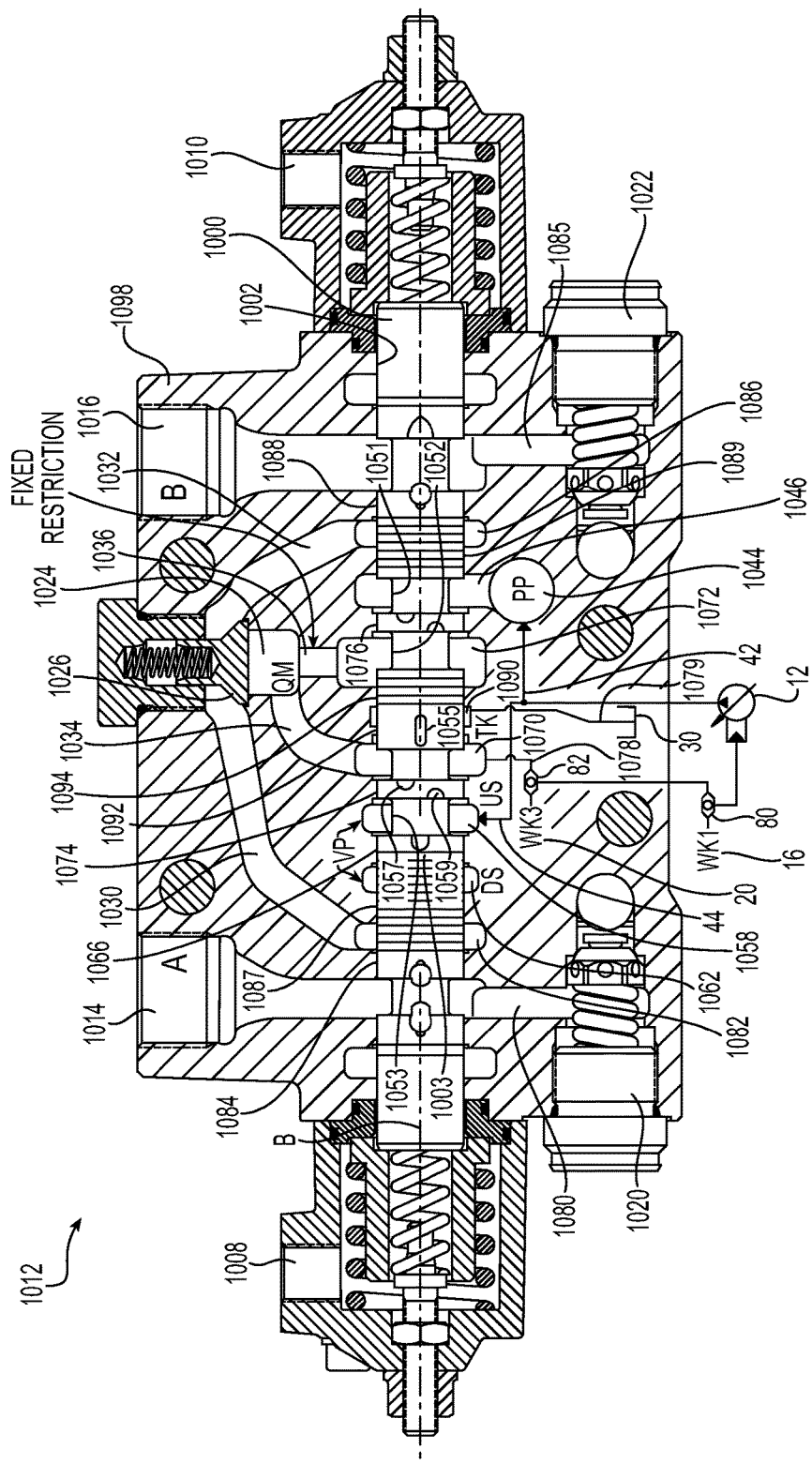
FIG. 14 shows a cross-section of another exemplary worksection.

Referring now to FIG. 14, another exemplary (seventh) worksection 1012 is shown. The seventh worksection 1012 is substantially the same as or similar to the above-referenced second worksection 18, and consequently the same or similar reference numerals, but with a prefix "10", are used to denote structures corresponding to the same or similar structures in the worksection. In the illustrated embodiment, the spool 1000 has a spool land 1003 which may have one or more metering notches. The spool land 1003 may be configured to cooperate with the land 1066 to enable variable path flow to pass to variable path downstream cavity 1062 when the spool 1000 moves to a first position (e.g., per HP "B" or high-pressure (or pump flow) to workport 1016, such that the spool 1000 moves toward the left as viewed in FIG. 14).

Figure 15:
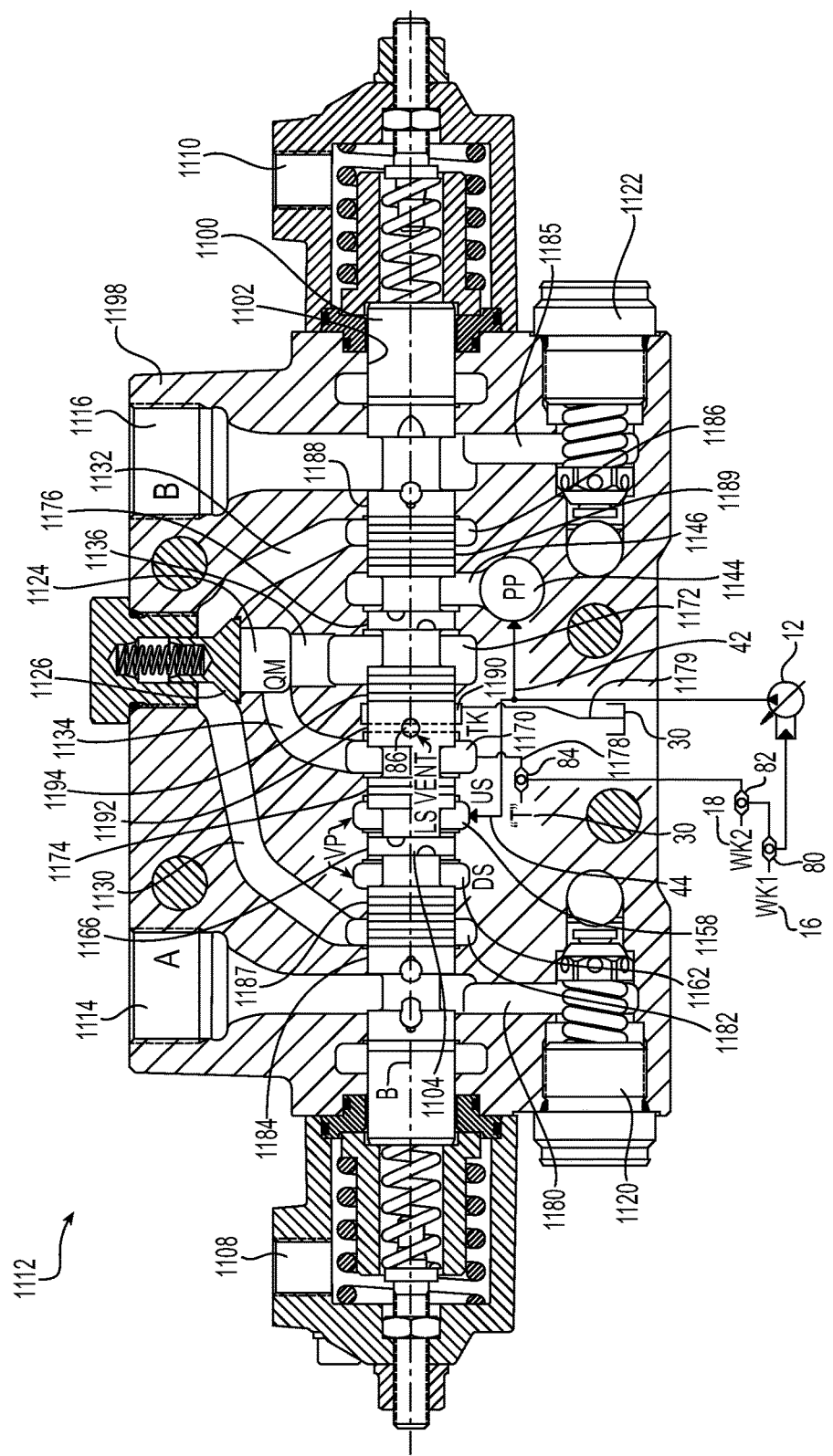
FIG. 15 shows a cross-section of yet another exemplary worksection.

Referring now to FIG. 15, another exemplary (eighth) worksection 1112 is shown. The eighth worksection 1112 is substantially the same as or similar to the above-referenced third worksection 20, and consequently the same or similar reference numerals, but with a prefix "11", are used to denote structures corresponding to the same or similar structures in the worksection. In the illustrated embodiment, the spool 1100 has a spool land 1104 which may have one or more metering notches. The spool land 1104 may be configured to cooperate with the land 1166 to meter variable path flow to downstream cavity 1162 for priority over downstream cavity 1162 when the spool 1000 moves to a first or a second position (e.g., per HP "A and B" or high-pressure (or pump flow) to workports 1114 or 1116, such that the spool 1000 moves toward the right or left as viewed in FIG. 15).

Figure 16:
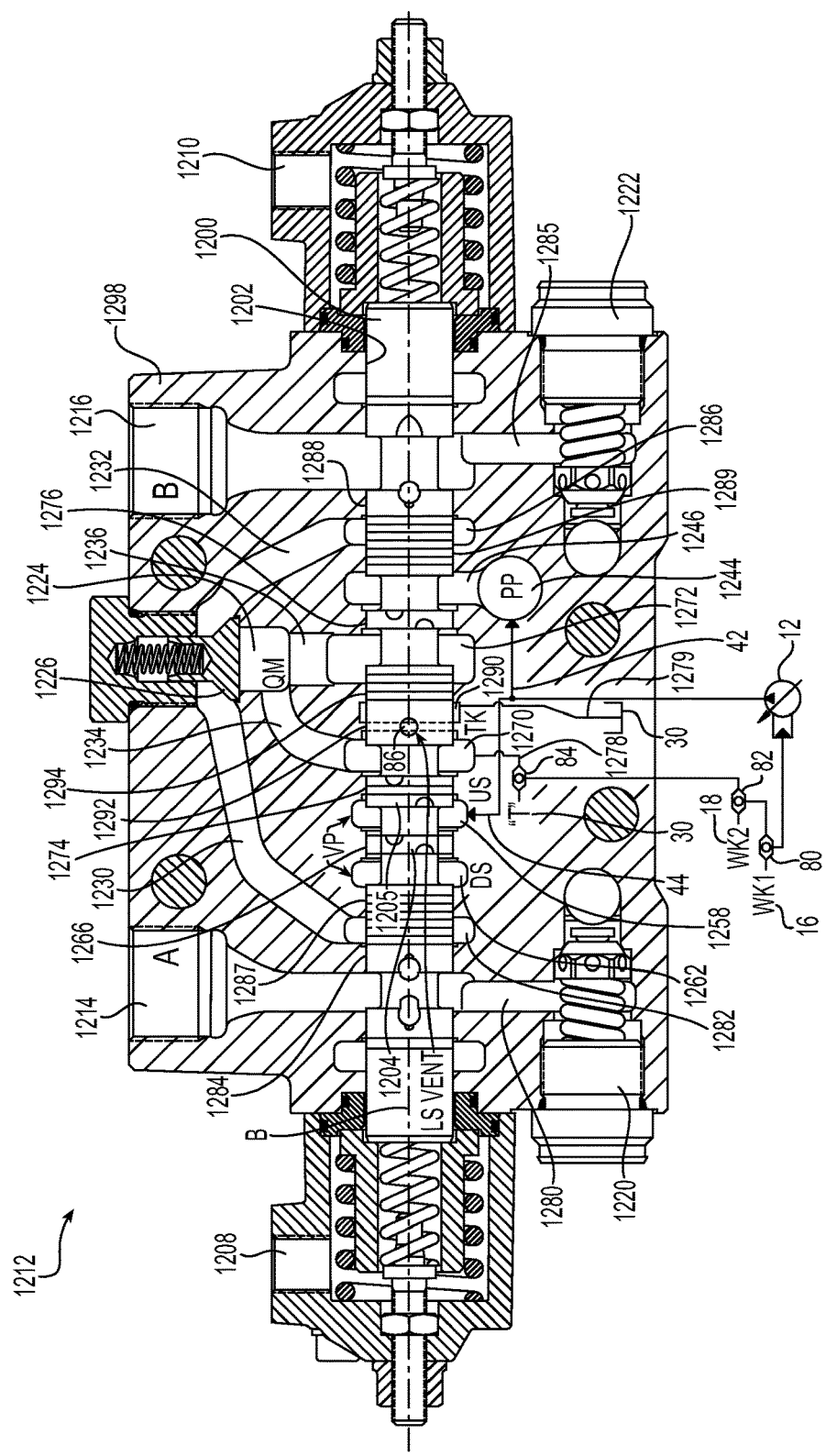
FIG. 16 shows a cross-section of still another exemplary worksection.

Referring now to FIG. 16, another exemplary (ninth) worksection 1212 is shown. The ninth worksection 1212 is substantially the same as or similar to the above-referenced eighth worksection 1112, and consequently the same or similar reference numerals, but with a prefix "12" instead of the prefix "11", are used to denote structures corresponding to the same or similar structures in the worksection. In the illustrated embodiment, the spool 1200 further includes a spool land 1205 which may have one or more metering notches. The spool land 1205 may be configured to cooperate with the land 1274 such that metered flow is provided from the variable upstream cavity 1258 to the metered fluid chamber 1224 and/or the workports 1214 and 1216.

Figure 17:
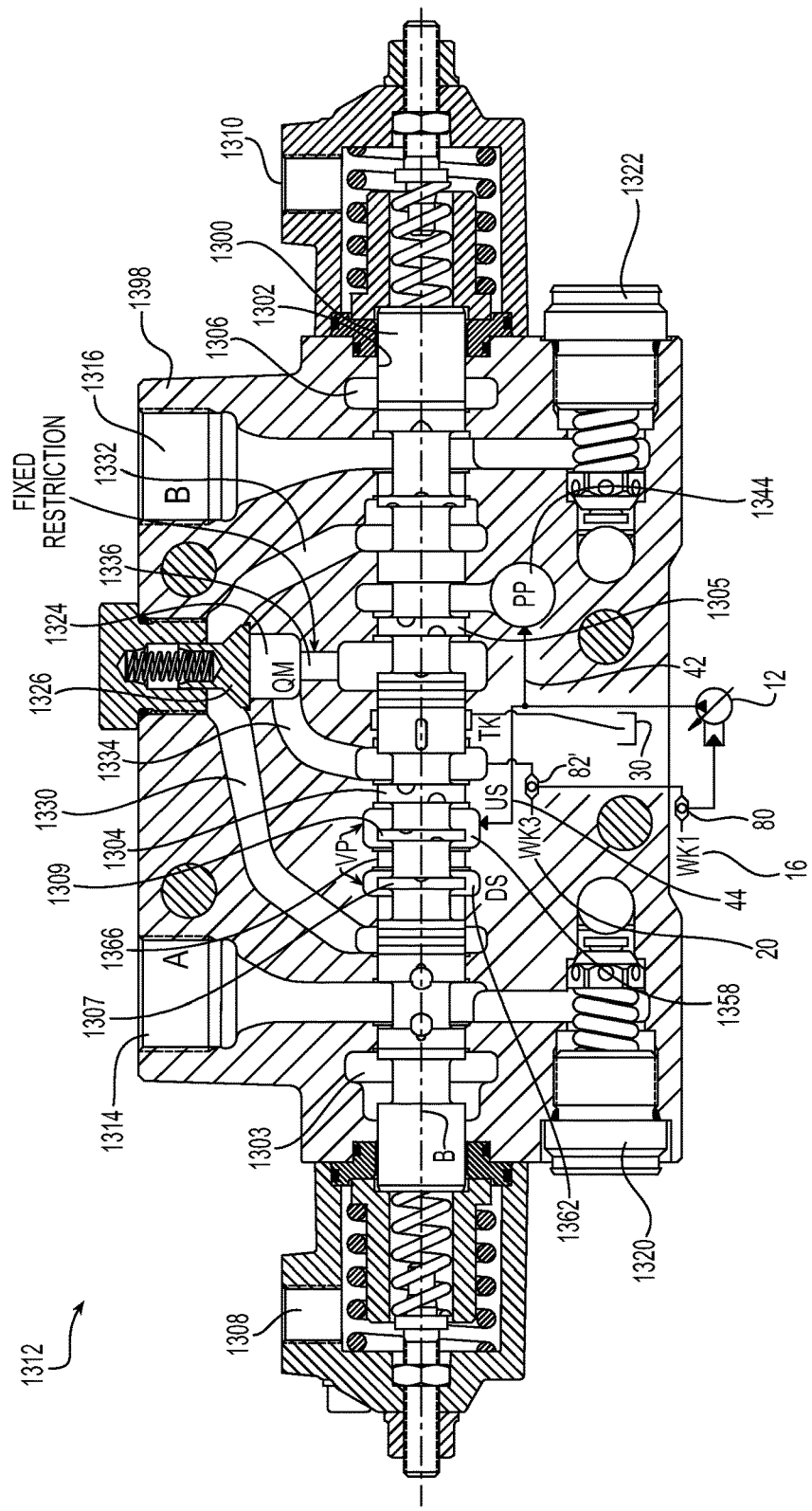
FIG. 17 shows a cross-section of another exemplary worksection.

Referring now to FIG. 17, another exemplary (tenth) worksection 1312 is shown. The tenth worksection 1312 is substantially the same as or similar to the above-referenced worksections or the below-referenced worksection 1512, and consequently the same or similar reference numerals, but with a prefix "13", are used to denote structures corresponding to the same or similar structures in the worksection.

The tenth ("four position, four way regenerative float") worksection 1312 may include a body 1398, a spool 1300 disposed in a spool bore 1302 of the body 1398, a first workport 1314, a second workport 1316, a first pilot port 1308, a second pilot port 1310, a first relief valve 1320, a second relief valve 1322.

The body 1398 may include a metered fluid chamber 1324 open to the spool bore 1302, a parallel pressure flow passage 1344, a variable upstream cavity 1358, and a variable downstream cavity 1362, which may each function similar to those in the worksections (e.g., 16, 18, and/or 20) described above.

In the illustrated embodiment, the spool 1300 has spool lands 1304 and 1305, which may have metering notches. The spool lands 1304 and 1305 are each configured to cooperate with corresponding body lands. Qmet (Q=flow and "met"=metered) flow is the result of the sum of any flow from the variable flow path 44 and the parallel flow path 42 minus any flow used for force sensing. The workport 1314 or 1316 input flow may connect to respective tank return passages 1303 and 1306. The spool 1300 may further include lands 1307 and 1309, which may have metering notches, and which may be configured to cooperate with body land 1366 to meter and eventually block variable path flow to variable path downstream cavity 1362 to have priority over downstream flow. In addition, in a fourth position float, the workport 1314 and 1316 input flow may connect to tank return, and the workport 1316 input flow may optionally be regenerated to workport 1314, where flow is blocked to the metered fluid chamber 1324, and variable path upstream cavity 1358 is connected to variable path downstream cavity 1362.

Figure 18:
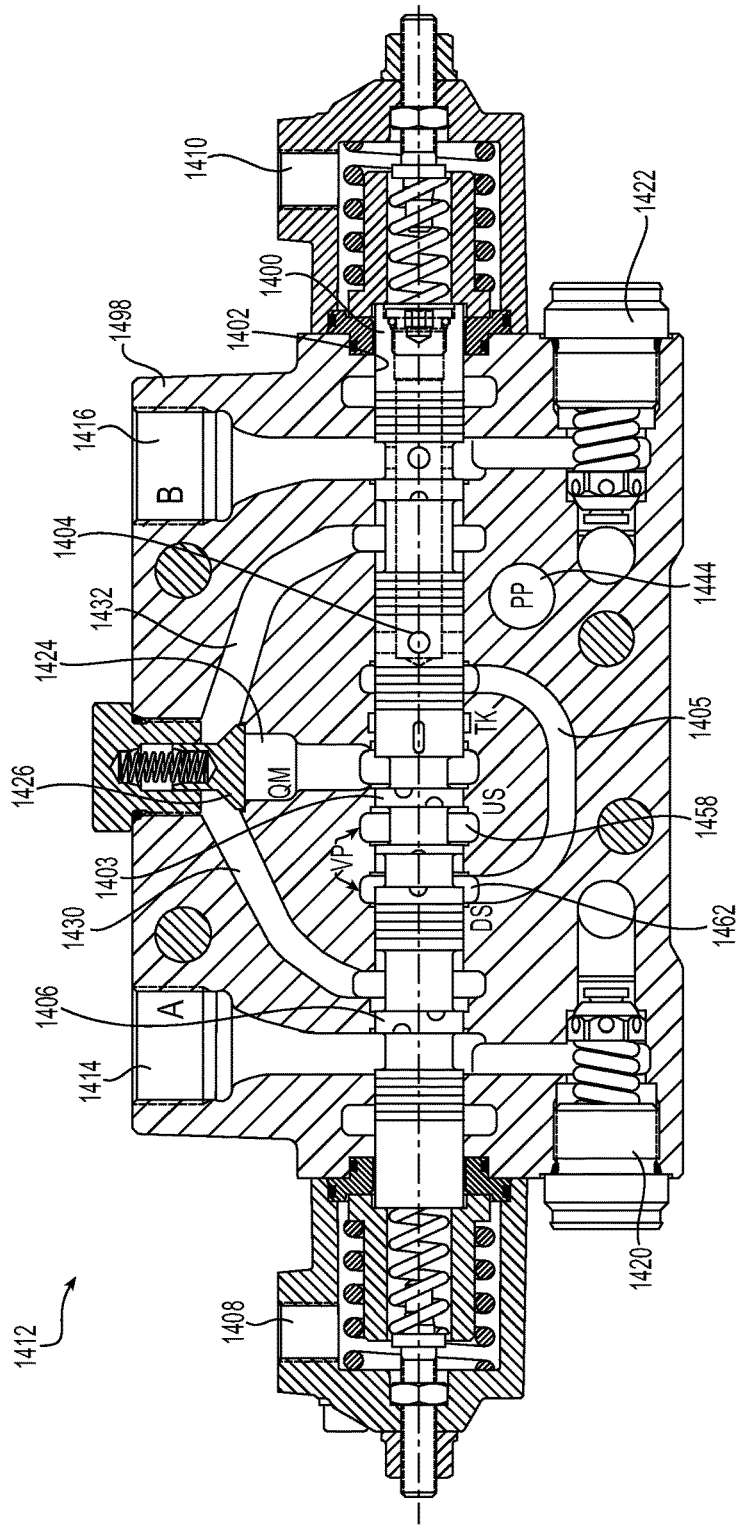
FIG. 18 shows a cross-section of yet another exemplary worksection.

Referring now to FIG. 18, another exemplary (eleventh) worksection 1412 is shown. The eleventh worksection is effectively a combination of the fourth ("series") worksection 512 (shown in FIG. 8) and the fifth ("three-position regenerative") worksection 712 (shown in FIG. 11); and consequently the same or similar reference numerals, but with a prefix "14", are used to denote structures corresponding to the same or similar structures in the worksection.

The eleventh ("series HP A/regenerative HP B") worksection 1412 may include a body 1498, a spool 1400 disposed in a spool bore 1402 of the body 1498, a first workport 1414, a second workport 1416, a first pilot port 1408, a second pilot port 1410, a first relief valve 1420, a second relief valve 1422.

The body 1498 may include a metered fluid chamber 1424 open to the spool bore 1402, a parallel pressure flow passage 1444, a variable upstream cavity 1458, and a variable downstream cavity 1462, which may each function similar to those in the worksections described above.

In the illustrated embodiment, the spool 1400 has a spool land 1403, which may have metering notches. The spool land 1403 may be configured to cooperate with a corresponding body land to meter flow from the variable path upstream cavity 1458 to the metered fluid chamber 1424. The workport 1416 input flow may connect to the variable path downstream cavity 1462 via an internal bore or passage 1404 in the spool 1400 and via a bridge 1405. In the illustrated embodiment, the parallel pressure passage 1444 may not supply flow to the metered fluid chamber 1424, but it may communicate parallel path flow downstream. Also in the illustrated embodiment, a spool land 1406 may cooperate with a corresponding body land such that workport 1414 input flow may connect and/or regenerate to workport 1416.

Figure 19:
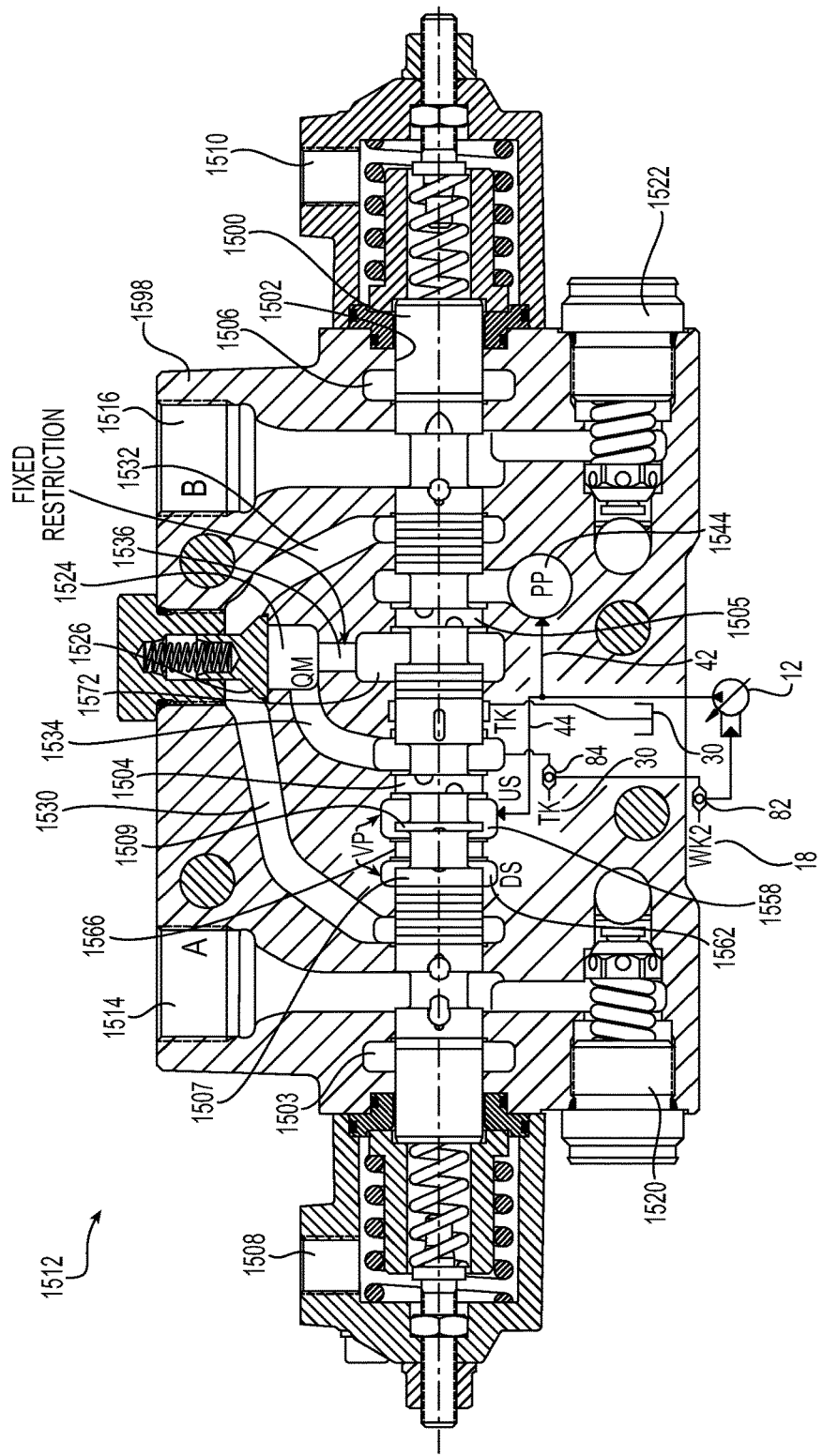
FIG. 19 shows a cross-section of still another exemplary worksection.

Referring now to FIG. 19, another exemplary (twelfth) worksection 1512 is shown. The twelfth worksection 1512 is substantially the same as or similar to the above-referenced first worksection 16, and consequently the same or similar reference numerals, but with a prefix "15", are used to denote structures corresponding to the same or similar structures in the worksection.

In the illustrated embodiment, the spool 1500 further includes a spool land 1504 which may have one or more metering notches. The spool land 1504 may be configured to cooperate with a corresponding body land. Qmet (Q=flow and "met"=metered) flow is the result of the sum of any flow from the variable flow path 44 and the parallel flow path 42 minus any flow used for force sensing. The body 1598 may include a fixed fluid restriction 1536 disposed between the metered fluid chamber 1524 and a metered cavity 1572. The workport 1514 or 1516 input flow may connect to respective tank return passages 1503 and 1506. The spool 1500 may further include lands 1507 and 1509, which may have metering notches, and which may be configured to cooperate with body land 1566 to meter and eventually block variable path flow to variable path downstream cavity 1562 to have priority over downstream flow.

Figure 20:
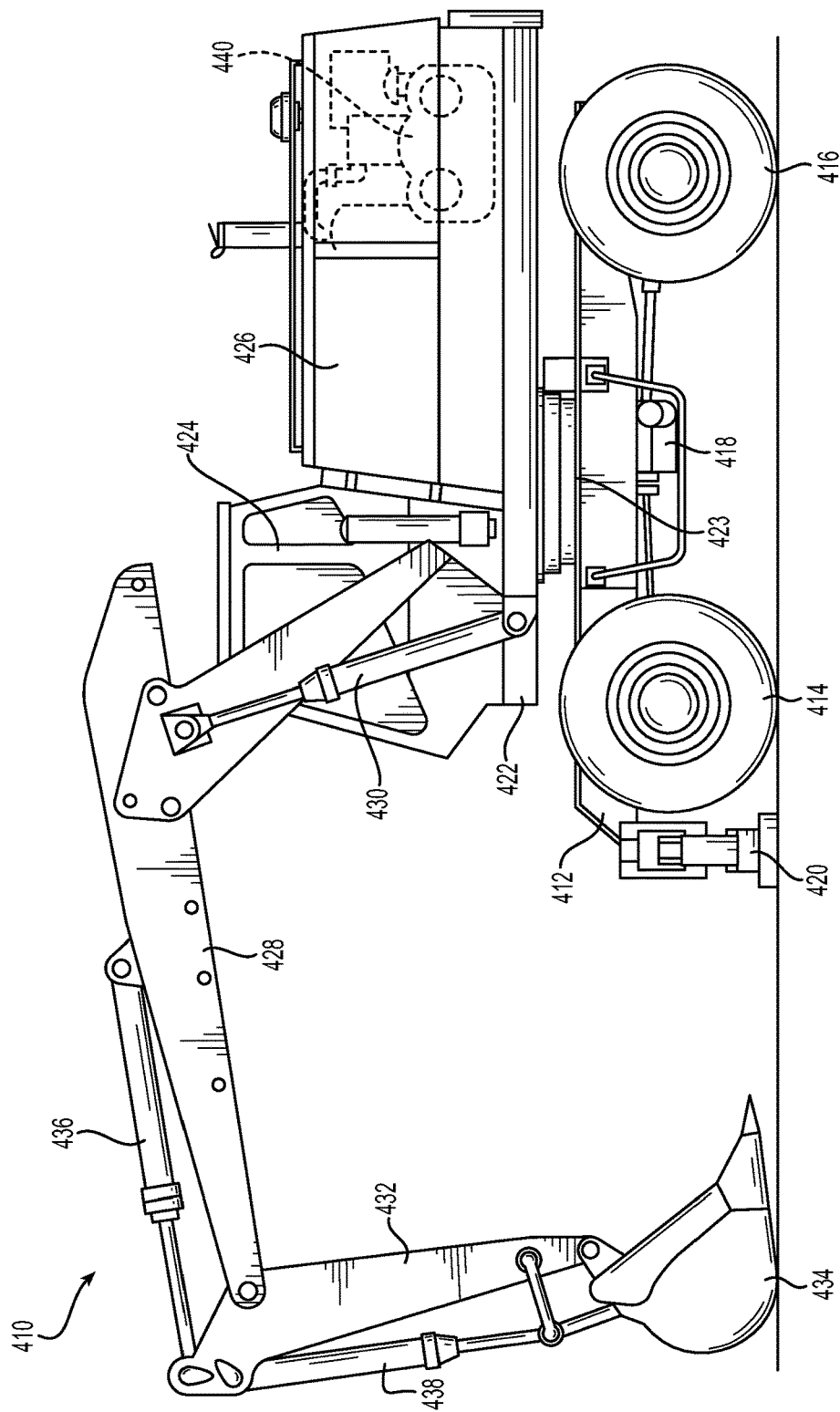
FIG. 20 shows an excavator for use with exemplary hydraulic worksections.

Referring now to FIG. 20, an exemplary wheel-type hydraulic excavator is illustrated generally at reference numeral 400. Although any hydraulic machine may be suitable as described above, this excavator 400 is provided for illustration purposes and is not meant to be limiting. The excavator 400 includes a body or undercarriage 412 supported on suitable front and rear wheels 414 and 416 respectively driven by a suitable hydraulic motor 418. Outriggers 420 are secured to the body 412 and extendable by suitable hydraulic actuators (not shown) into engagement with the ground to stabilize the vehicle 410 during operation. A suitable rotatable platform 422 is supported by the body 412 for rotation relative to the body by one or more hydraulic actuators, such as a swing motor 423 and includes an operator compartment 424 and an engine compartment 426. A boom 428 is pivotally mounted on the rotatable platform 422 and manipulated about its pivotal point by one or more hydraulic actuators, such as one or more piston-cylinder assemblies 430. An arm 432 is pivotally carried by the boom 428 and pivotally carries on the end thereof a bucket 434 with hydraulic actuators, such as one or more piston-cylinder assemblies 436 and 438 operatively connected for manipulating the arm 432 and bucket 434 respectively. Fluid for manipulating and controlling the hydraulic actuators is supplied by a hydraulic system 440 described above and pressurized by a pump driven by a prime mover, such as an engine. Any and all exemplary systems, valves, worksections, etc. described above may be used on a hydraulic machine 400 above in any combination.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydraulic system comprising:
   a pressure source;
   a first worksection having a spool disposed in a spool bore of the first worksection;
   a second worksection having a spool disposed in a spool bore of the second worksection;
   a parallel flow pressure passage fluidly connecting the pressure source to the first and second worksections in parallel and opening into the spool bores of the worksections; and
   a variable flow path fluidly connecting the pressure source to the first and second worksections in series, the variable flow path having a first variable flow pressure passage fluidly connecting the pressure source to the spool bore of the first worksection, and a second variable flow pressure passage fluidly connecting the spool bore of the first worksection to the spool bore of the second worksection;
   wherein the first worksection includes a metered fluid chamber open to the spool bore of the first worksection, and
   wherein the spool of the first worksection is configured to selectively connect and meter flow from either the first variable flow pressure passage to the metered fluid chamber, or both the parallel flow pressure passage and the first variable flow pressure passage to the metered fluid chamber.

2. The hydraulic system of claim 1, wherein the spool of the first worksection is configured to selectively connect the parallel flow pressure passage and the first variable flow pressure passage to the metered fluid chamber.

3. The hydraulic system of claim 1, wherein the metered fluid chamber is downstream of the spool bore.

4. The hydraulic system of claim 1, wherein the first worksection is configured to selectively connect the metered fluid chamber to one or more workports;
- wherein the worksection further includes one or more passages fluidly connecting the metered fluid chamber to the spool bore, the one or more passages being configured to supply metered fluid flow from the metered fluid chamber to the one or more workports via the spool bore; and
- wherein the spool is configured to selectively connect the parallel flow pressure passage to the metered fluid chamber to enable flow from the metered fluid chamber to the one or more workports.

5. The hydraulic system of claim 1, wherein the spool of the first worksection is configured to freely allow flow from the first variable flow pressure passage to the second variable flow pressure passage in every position of the spool of the first worksection.

6. The hydraulic system of claim 1, wherein the spool of the first worksection is configured to block flow from the first variable flow pressure passage to the second variable flow pressure passage in every position of the spool of the first worksection.

7. The hydraulic system of claim 1, wherein the first worksection further comprises a force sensing cavity opening to the spool bore and to a drain passage,
- wherein the spool of the first worksection is moveable from a neutral position to a first displaced position,
- wherein in the neutral position the spool is configured to block flow from the first variable flow pressure passage to the second variable flow pressure passage, and
- wherein in the first displaced position, the spool is configured to allow flow from the first variable flow pressure passage to the second variable flow pressure passage.

8. The hydraulic system of claim 1, wherein the first worksection further comprises a load sense vent opening to the spool bore,
- wherein the spool of the first worksection is movable from a neutral position to a first displaced position and from the neutral position to a second displaced position in a direction opposite the first position, and
- wherein in the neutral position the spool is configured to block flow from the first variable flow pressure passage to the second variable flow pressure passage,
- wherein in the first displaced position, the spool is configured to meter flow from the first variable flow pressure passage to the second variable flow pressure passage, and
- wherein in the second displaced position, the spool is configured to meter flow from the first variable flow pressure passage to the second variable flow pressure passage.

9. The hydraulic system of claim 1, wherein the spool of the first worksection is configured to selectively meter and/or block flow from the first variable flow pressure passage to the second variable flow pressure passage.

10. The hydraulic system of claim 1,
- wherein the second worksection includes a metered fluid chamber open to the spool bore of the second worksection, and
- wherein the spool of the second worksection is configured to selectively connect the parallel flow pressure passage and/or the second variable flow pressure passage to the metered fluid chamber of the second worksection.

11. The hydraulic system of claim 1,
- wherein the first worksection includes a first workport and a second workport fluidly connected to the spool bore; and
- wherein the spool of the first worksection is configured to selectively allow input flow from one of the first workport or the second workport to pass to the other of the first workport or the second workport.

12. The hydraulic system of claim 11,
- wherein all of the input flow from one of the first workport or the second workport passes to the other of the first workport or the second workport;
- wherein the spool of the first worksection is also configured to selectively allow input flow from one of the first workport or the second workport to pass to a tank or a reservoir;
- wherein a portion of the input flow from one of the first workport or the second workport passes to the other of the first workport or the second workport; and
- wherein a portion of the input flow from one of the first workport or the second workport passes to the tank or the reservoir.

13. The hydraulic system of claim 1, wherein the first worksection further comprises a check valve disposed between the metered fluid chamber and a workport such that flow from a workport to the metered fluid chamber is prevented.

14. The hydraulic system of claim 1, wherein the first worksection further comprises a pressure compensator valve disposed between the metered fluid chamber and a workport such that flow from a workport to the metered fluid chamber is regulated.

15. The hydraulic system of claim 1, wherein the pressure source is a load sense margin pressure source.

16. The hydraulic system of claim 1, wherein the variable flow path includes thermal transfer.

17. A hydraulic system comprising:
- a pressure source;
- a first worksection having a spool disposed in a spool bore of the first worksection;
- a second worksection having a spool disposed in a spool bore of the second worksection;
- a parallel flow pressure passage fluidly connecting the pressure source to the first and second worksections in parallel; and
- a variable flow path fluidly connecting the pressure source to the first and second worksections in series, the variable flow path having a first variable flow pressure passage fluidly connecting the pressure source to the spool bore of the first worksection, and a second variable flow pressure passage fluidly connecting the spool bore of the first worksection to the spool bore of the second worksection;
- wherein the first worksection includes a metered fluid chamber open to the spool bore of the first worksection;
- wherein the parallel flow pressure passage of the first worksection does not open into the spool bore of the first worksection; and
- wherein the spool of the first worksection is configured to selectively connect the first variable flow pressure passage to the metered fluid chamber.

18. The hydraulic system according to claim 17, wherein the first worksection further includes a first workport and a second workport; and
- wherein input flow from the first workport and/or second workport fluidly connects to the second variable flow pressure passage.

19. The hydraulic system according to claim 17, wherein the first worksection is actuated simultaneously with the second worksection, or is operated independently of the second worksection.

20. The hydraulic system according to claim 17,
- wherein the parallel flow pressure passage and/or the variable flow path are configured for power beyond capability; or
- wherein the parallel flow pressure passage is configured for pressure beyond capability and the variable flow path outputs to a tank or reservoir.

* * * * *